US010762678B2

United States Patent
Gupta et al.

(10) Patent No.: US 10,762,678 B2
(45) Date of Patent: Sep. 1, 2020

(54) REPRESENTING AN IMMERSIVE CONTENT FEED USING EXTENDED REALITY BASED ON RELEVANCY

(71) Applicant: Accenture Global Solutions Limited, Dublin (IE)

(72) Inventors: Sunjeet Gupta, Pune (IN); Rahul Mantri, Pune (IN); Asheesh Gupta, Bangalore (IN); Inderjit Singh, Haryana (IN); Sudhir Kudva Karkale, Bangalore (IN); Shridhar Rajgopalan, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 114 days.

(21) Appl. No.: 16/152,201

(22) Filed: Oct. 4, 2018

(65) Prior Publication Data

US 2020/0111242 A1 Apr. 9, 2020

(51) Int. Cl.
*G06T 11/60* (2006.01)
*G06F 16/25* (2019.01)
*G06F 40/30* (2020.01)
*G06F 40/205* (2020.01)
*G06F 40/284* (2020.01)

(52) U.S. Cl.
CPC .......... *G06T 11/60* (2013.01); *G06F 16/258* (2019.01); *G06F 40/205* (2020.01); *G06F 40/284* (2020.01); *G06F 40/30* (2020.01)

(58) Field of Classification Search
CPC .... G06F 16/258; G06F 40/284; G06F 40/205; G06F 40/30; G06T 11/60
USPC ......................................................... 345/633
See application file for complete search history.

(56) References Cited

U.S. PATENT DOCUMENTS

| 10,135,950 | B2 * | 11/2018 | Rothera ................. G10L 15/00 |
| 10,528,128 | B1 * | 1/2020 | Yoon .................. G02B 27/0172 |
| 2018/0349700 | A1 * | 12/2018 | Percuoco ............... G06Q 10/00 |
| 2018/0356967 | A1 * | 12/2018 | Rasheed ............. G06F 3/04847 |
| 2019/0104342 | A1 * | 4/2019 | Catalano ............. H04N 21/4662 |
| 2019/0180082 | A1 * | 6/2019 | Moravec .................. G06T 7/70 |
| 2019/0304157 | A1 * | 10/2019 | Amer .................... G06N 3/0454 |

* cited by examiner

*Primary Examiner* — King Y Poon
*Assistant Examiner* — Vincent Peren
(74) *Attorney, Agent, or Firm* — Harrity & Harrity, LLP

(57) ABSTRACT

A device may generate, based on receiving feeder content, a structured format of the feeder content. The device may generate, based on the structured format of the feeder content, one or more semantic mappings for the feeder content. The device may generate, based on the one or more semantic mappings for the feeder content, an electronic storyboard of the feeder content. The device may generate an extended reality rendered content feed based on the electronic storyboard of the feeder content. The device may provide the extended reality rendered content feed to an extended reality device.

23 Claims, 10 Drawing Sheets

REPRESENTING AN IMMERSIVE CONTENT FEED USING EXTENDED REALITY BASED ON RELEVANCY

BACKGROUND

Rapid advances are being made in extended reality devices, such as augmented reality devices, virtual reality devices, mixed reality devices, and/or the like. Some studies indicate that immersive experiences with extended reality devices leverage affordances of natural human perception (e.g., spatial memory, motion, manipulation, feedback, and/or the like) for better comprehension of three-dimensional (3D) visualizations and enhanced creativity.

SUMMARY

According to some implementations, a device may include one or more memories, and one or more processors, communicatively coupled to the one or more memories, to generate, based on receiving feeder content, a structured format of the feeder content. The one or more processors may generate, based on the structured format of the feeder content, one or more semantic mappings for the feeder content. The one or more processors may generate, based on the one or more semantic mappings for the feeder content, an electronic storyboard of the feeder content. The one or more processors may generate an extended reality rendered content feed based on the electronic storyboard of the feeder content. The one or more processors may provide the extended reality rendered content feed to an extended reality device.

According to some implementations, a method may include generating, by a device and based on receiving feeder content, a structured format of the feeder content. The method may include generating, by the device and based on the structured format of the feeder content, one or more semantic mappings for the feeder content. The method may include generating, by the device and based on the one or more semantic mappings for the feeder content, an electronic storyboard of the feeder content. The method may include generating, by the device, an extended reality rendered content feed based on the electronic storyboard of the feeder content. The method may include generating, by the device, a relevancy score for the extended reality rendered content feed. The method may include determining, by the device, whether the relevancy score satisfies a relevancy score threshold. The method may include providing, by the device and to an extended reality device, the extended reality rendered content feed based on determining that the relevancy score satisfies the relevancy score threshold.

According to some implementations, a non-transitory computer-readable medium may store instructions that include one or more instructions that, when executed by one or more processors of a device, cause the one or more processors to generate, based on receiving feeder content, a structured format of the feeder content. The one or more instructions, when executed by one or more processors of the device, may cause the one or more processors to generate, based on the structured format of the feeder content, one or more semantic mappings for the feeder content. The one or more instructions, when executed by one or more processors of the device, may cause the one or more processors to generate, based on the one or more semantic mappings for the feeder content, an electronic storyboard of the feeder content. The one or more instructions, when executed by one or more processors of the device, may cause the one or more processors to generate an extended reality rendered content feed based on the electronic storyboard of the feeder content. The one or more instructions, when executed by one or more processors of the device, may cause the one or more processors to generate a relevancy score for the extended reality rendered content feed. The one or more instructions, when executed by one or more processors of the device, may cause the one or more processors to determine whether the relevancy score satisfies a relevancy score threshold. Based on determining that the relevancy score does not satisfy the relevancy score threshold, the one or more instructions, when executed by one or more processors of the device, may cause the one or more processors to generate at least one of a modified storyboard of the feeder content or a modified extended reality rendered content feed. Based on determining that the relevancy score satisfies the relevancy score threshold, the one or more instructions, when executed by one or more processors of the device, may cause the one or more processors to provide, to an extended reality device, the extended reality rendered content feed.

DETAILED DESCRIPTION

Figure 1A:
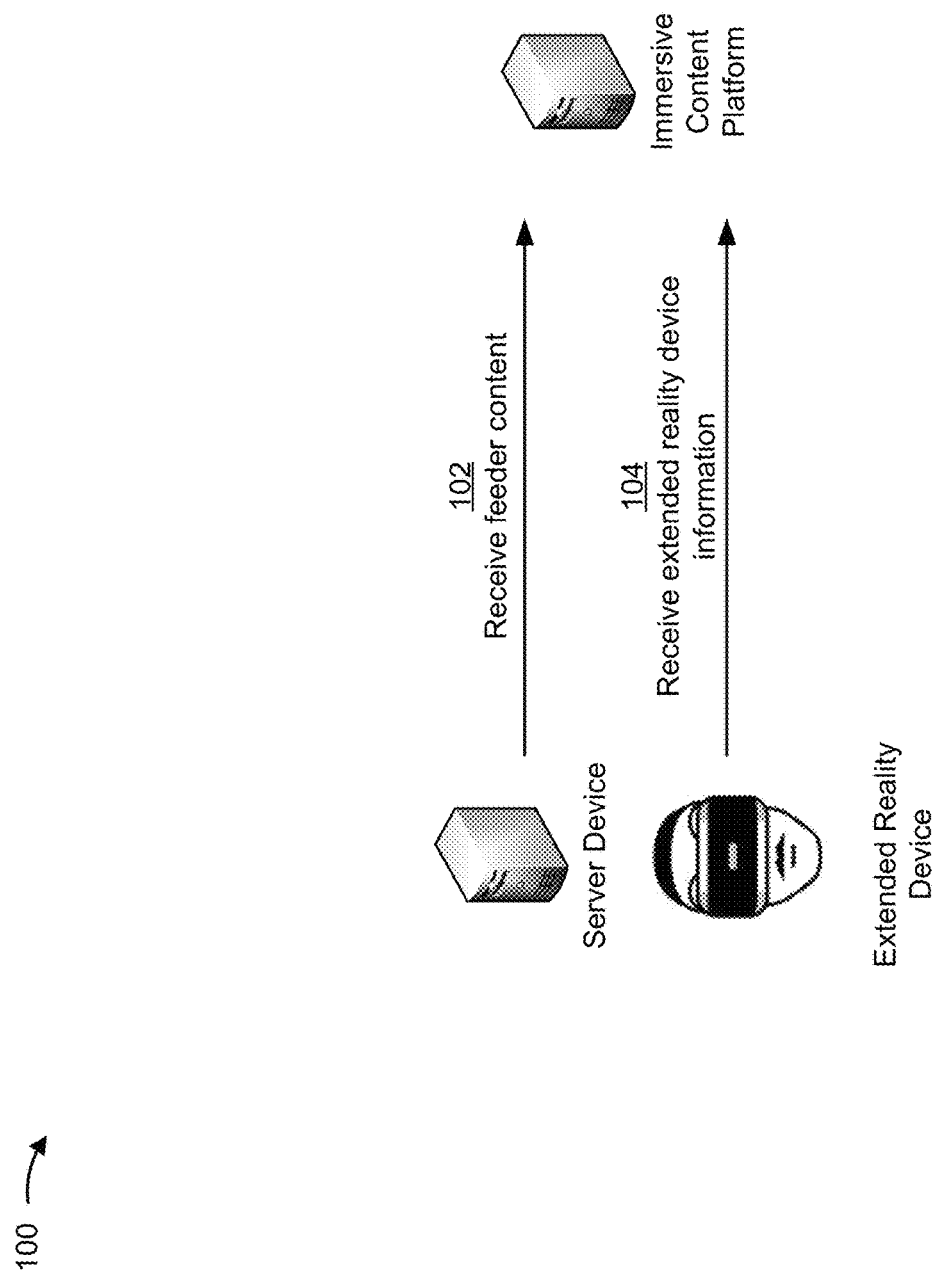
FIGS. 1A-1D are diagrams of an example implementation described herein.

The following detailed description of example implementations refers to the accompanying drawings. The same reference numbers in different drawings may identify the same or similar elements.

In some cases, generating a content feed may be a manual and often times convoluted process. For example, a user may have to manually generate the content feed from an input, with little to no direction for determining what content should be included in the content feed. As a result, the process for generating the content feed often is subjective, which produces inconsistent results. Moreover, the generated content feed may not be immersive for the viewer, since the content feed may often times be two-dimensional images, video, and/or the like.

Some implementations, described herein, provide an immersive content platform that may automatically create immersive representations of content feeds for extended reality devices. The immersive content platform may allow for faster creation of content feeds and may allow for users of the extended reality devices to comprehend the content feeds via a more intuitive and immersive medium. In some implementations, the immersive content platform may generate, based on receiving feeder content, a structured format of the feeder content. The immersive content platform may generate, based on the structured format of the feeder content, one or more semantic mappings for the feeder content. The immersive content platform may generate, based on the one or more semantic mappings for the feeder content, an electronic storyboard of the feeder content. The immersive content platform may generate an extended reality rendered content feed based on the electronic storyboard of the feeder content. The immersive content platform may provide, to an extended reality device, the extended reality rendered content feed.

In this way, the immersive content platform may automatically create an immersive extended reality rendered content feed of the feeder content. In this way, several different stages of the process for generating the extended reality rendered content feed are automated, which may remove human subjectivity and waste from the process, and which may improve speed and efficiency of the process and conserve computing resources (e.g., processor resources, memory resources, and/or the like). Furthermore, implementations described herein use a rigorous, computerized process to perform tasks or roles that were not previously performed or were previously performed using subjective human intuition or input. For example, currently there does not exist a technique to generate the extended reality rendered content feed using machine learning and artificial intelligence. As another example, the immersive content platform may use various relevancy checks throughout the process of generating the extended reality rendered content feed, which reduces and/or eliminates waste in the process caused by subjective human intuition or input. Finally, automating the process for generating the extended reality rendered content feed conserves computing resources (e.g., processor resources, memory resources, and/or the like) that would otherwise be wasted in attempting to manually identify and select representations of objects to be included in a storyboard for the extended reality rendered content feed, in attempting to manually identify and select representations of objects to be included in the extended reality rendered content feed, and/or the like.

FIGS. 1A-1D are diagrams of an example implementation 100 described herein. As shown in FIGS. 1A-1D, implementation 100 may include a server device, an extended reality device, an immersive content platform, and/or the like.

The server device may store and/or transmit various types of information to the immersive content platform, to the extended reality device, and/or the like. The information may include feeder content, storyboard templates, storyboard content, extended reality content, and/or the like. In some implementations, the application information may include a codebase associated with the software application, one or more modifications to be made to the software application, design information for the software application, and/or the like. In some implementations, the feeder content may include information associated with a scenario, such as an image that represents the scenario, a text description of the scenario, a video representing the scenario, and/or the like. In some implementations, the scenario may be associated with a user of the extended reality device. For example, the scenario may include the user wanting to purchase a house, may include the user wanting to rent an apartment, and/or the like.

In some implementations, the storyboard templates may include information identifying a structure of one or more electronic storyboards to be generated for the feeder content. The one or more electronic storyboards may be an initial representation of the scenario identified in the feeder content, and may be used by the immersive content platform to generate an extended reality rendered content feed for the feeder content. The structure specified by a storyboard template may identify one or more electronic storyboard types to be generated for the feeder content, may specify the storyboard content (e.g., images, text, videos, and/or the like, that may be included in an electronic storyboard) to be included in the one or more electronic storyboards, and/or the like. As an example, a storyboard template associated with a scenario for purchasing a house may specify a first electronic storyboard for touring a house, may specify a second electronic storyboard for obtaining a mortgage to purchase the house, and may specify a third electronic storyboard for closing the purchase on the house.

The extended reality device may include an augmented reality device, a virtual reality device, a mixed reality device, and/or the like, that is capable of displaying an extended reality rendered content feed. In some implementations, the extended reality device may be a wearable device (e.g., a virtual reality headset, an augmented reality headset, etc.), a hand-held device (e.g., a smartphone, a tablet computer, etc.), another type of device (e.g., a server device, a desktop computer device, etc.), and/or the like. In some implementations, the extended reality device may provide information to the immersive content platform. For example, the extended reality device may provide information associated with the extended reality device, such as information identifying an extended reality device type associated with the extended reality device (e.g., an augmented reality device, a virtual reality device, a mixed reality device, etc.), environmental information associated with the extended reality device (e.g., information identifying one or more lighting parameters of the extended reality device, information identifying one or more spatial data parameters of the extended reality device, etc.), and/or the like; may provide information associated with a user using the extended reality device (e.g., a name of the user, a location of the user, one or more preferences of the user, etc.), and/or the like.

The immersive content platform may include one or more devices capable of receiving information from the server device, from the extended reality device, and/or the like; capable of generating an extended reality rendered content feed; capable of providing the extended reality rendered content feed to the extended reality device, the server device, and/or the like; capable of receiving an input, associated with the extended reality rendered content feed, from the extended reality device and/or another input device; capable of updating and/or modifying the extended reality rendered content feed; and/or the like.

In some implementations, the immersive content platform may include various components, such as a content structure component, a mapping component, an audio/visual (A/V) generation component, a rendering component, an analysis component, and/or the like.

In some implementations, the content structure component may be capable of generating a structured format of feeder content. For example, the content structure component may generate the structured format of the feeder content by parsing, using natural language processing, the feeder content to identify one or more words included in the feeder content, and to categorize the one or more words into a plurality of categories using artificial intelligence and/or one or more machine learning algorithms.

In some implementations, the mapping component may generate one or more semantic mappings for the feeder content. For example, the mapping component may generate the one or more semantic mappings for the feeder content by mapping the identified and categorized words to one or more types of semantic mappings. The one or more types of semantic mappings may include, for example, a background mapping that includes one or more objects, identified in the feeder content, that are to be displayed in a background of the extended reality rendered content feed; a foreground mapping that includes one or more objects, identified in the feeder content, that are to be displayed in a foreground of the extended reality rendered content feed; an emotion mapping that includes one or more emotions, associated with the feeder content, that are to be represented in the extended reality rendered content feed; and or like.

In some implementations, the A/V generation component may generate an electronic storyboard for the feeder content. For example, the A/V generation component may generate the electronic storyboard based on the one or more semantic mappings for the feeder content. In some implementations, the rendering component may generate an extended reality rendered content feed of the electronic storyboard of the feeder content. For example, the extended reality rendered content feed may include an augmented reality rendered content feed, a virtual reality rendered content feed, a mixed reality rendered content feed, and/or the like. In some implementations, the analysis component may perform a relevancy assessment for the electronic storyboard, for the extended reality rendered content feed, and/or the like, to determine how relevant the electronic story board, the extended reality rendered content feed, and/or the like, is to the feeder content. The analysis component may provide the extended reality rendered content feed to the extended reality device, may provide an instruction to the A/V generation component to modify the electronic storyboard, may provide an instruction to the rendering component to modify the extended reality rendered content feed, and/or the like.

Turning to FIG. 1A, a user may want to generate an extended reality rendered content feed for feeder content, and accordingly may provide input to the immersive content platform to generate the extended reality rendered content feed. As shown by reference number 102, the server device may provide the feeder content to the immersive content platform based on the input. In some implementations, the server device may provide the feeder content based on receiving a request to provide the feeder content from the immersive content platform, may automatically provide the feeder content to the immersive content platform based on detecting the user providing the input to the immersive content platform to generate the extended reality rendered content feed, and/or the like. In some implementations, the user may provide the feeder content directly to the immersive content platform as the input to the immersive content platform.

As shown by reference number 104, the extended reality device may provide information to the immersive content platform. In some implementations, the extended reality device may provide the information based on receiving a request to provide the information, such as when the immersive content platform requests the information; may automatically provide the information to the immersive content platform based on determining that the immersive content platform has received the feeder content, and/or the like. The information may include information associated with the extended reality device, information associated with the user, and/or the like, as described above.

Figure 1B:
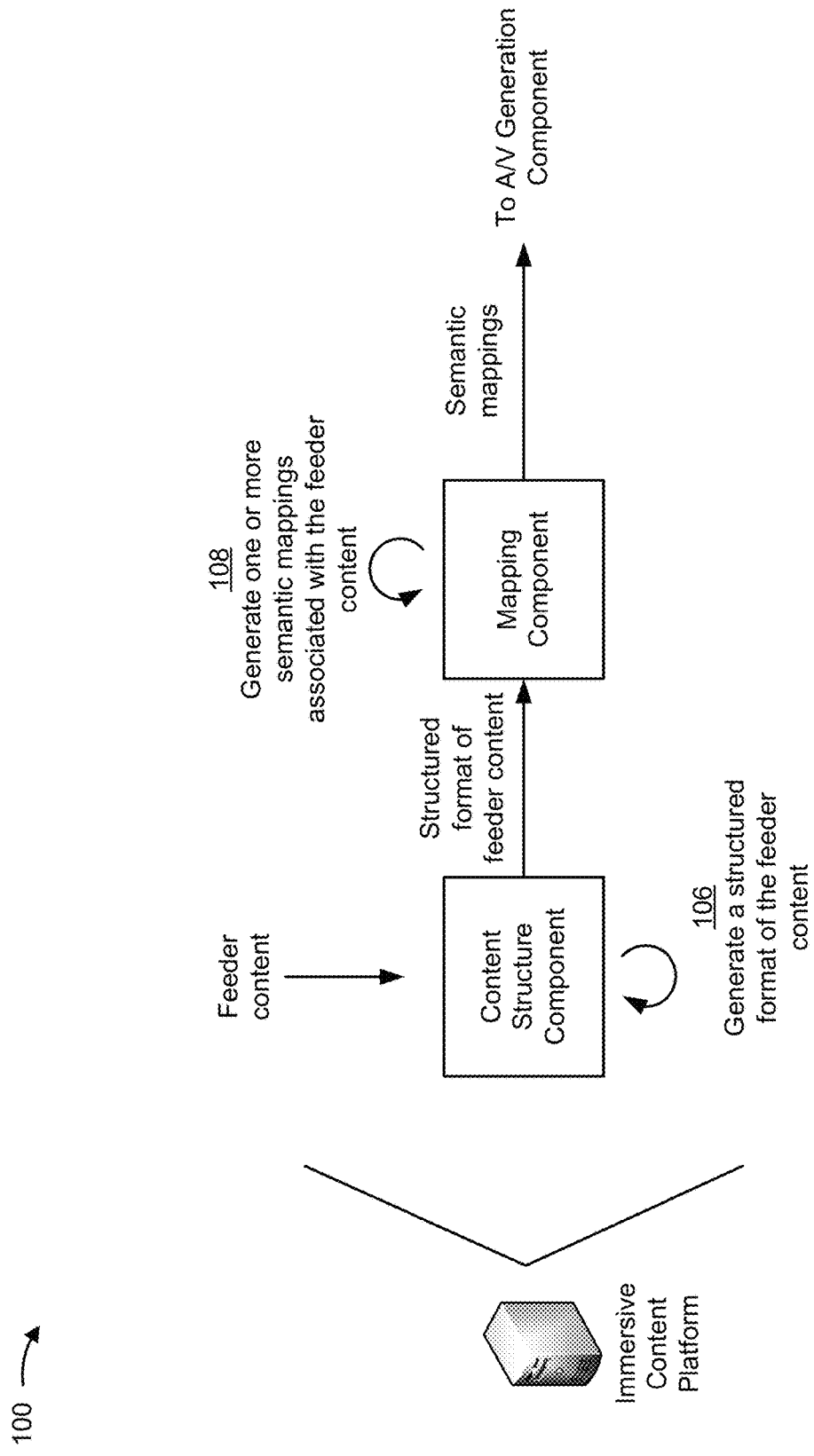

Turning to FIG. 1B, and as shown by reference number 106, the content structure component may receive the feeder content and may generate a structured format of the feeder content. For example, the content structure component may generate the structured format of the feeder content by parsing, using natural language processing, the feeder content to identify one or more words included in the feeder content, and to categorize the one or more words into a plurality of categories using artificial intelligence and/or one or more machine learning algorithms. In some implementations, each category, of the plurality of categories, may be associated with a category type. The category type may include an actor category type (e.g., a category type that identifies one or more actors identified in the feeder content), an object category type (e.g., a category type that identifies one or more objects identified in the feeder content), a geolocation category type (e.g., a category type that identifies one or more geographic locations identified in the feeder data), an action category type (e.g., a category type that identifies one or more actions that are identified in the feeder data), and/or the like.

In some implementations, the content structure component may categorize the one or more words using tokens. Each category, of the plurality of categories, may be associated with a respective token. Accordingly, the content structure component may determine that a particular word, of the one or more words, should be assigned to a particular category, of the plurality of categories, and accordingly may associate the token, associated with the particular category, with the particular word.

In some implementations, the content structure component may tokenize the one or more words using a pattern recognition machine learning algorithm, a probabilistic language parser machine learning algorithm, a neural dependency parser machine learning algorithm, a lexical analyzer machine learning algorithm, a named-entity recognition machine learning algorithm, and/or the like. For example, the content structure component may identify a word included in the feeder content, may use a named-entity recognition machine learning algorithm to determine that the word is a proper noun (e.g., a name of a person), and may associate the word with a token that is associated with an actor category. As another example, the content structure component may use a bag of words technique to identify a quantity of recurrence for each word, of the one or more words, identified in the content feed, and may use a naive Bayes classifier machine learning algorithm to categorize the words, of the one or more words, having a quantity of recurrence that satisfies a threshold quantity of recurrence.

As further shown in FIG. 1B, the content structure component may transmit the structured format of the feeder content to the mapping component. As shown by reference number 108, the mapping component may generate one or more semantic mappings for the feeder content. In some implementations, the mapping component may generate the one or more semantic mappings based on the structured format of the feeder content. For example, the mapping component may generate the one or more semantic mappings by mapping the one or more objects, actors, geolocations, actions, and/or the like, identified in the structured format of the feeder content, onto one or more semantic mapping types. The one or more semantic mapping types may include an emotional mapping, a background mapping, a foreground mapping, and/or the like.

The emotional mapping may include information mapping of one or more emotions, associated with the feeder content, onto an actor that was identified in the feeder content. For example, if the feeder content includes information describing a house purchase scenario, the mapping component may generate an emotional mapping, for an actor identified in the feeder content, that includes information mapping an anxious emotion, a confused emotion, and/or the like, to the actor. In some implementations, the mapping component may generate an emotion mapping that identifies a progression of emotions associated with the feeder content. For example, for the house purchase scenario, the mapping component may generate an emotional mapping that includes information mapping of an anxious emotion to illustrate that the actor is anxious at the beginning of the home purchase process, may include information mapping a confused emotion to illustrate that the actor is confused while obtaining a home mortgage to purchase the house, and may include information mapping a happy emotion to illustrate that the actor is happy after closing on the purchase of the house.

The background mapping may include information identifying one or more objects, one or more geolocations, one or more actions, and/or the like, identified and/or associated with the feeder content, that are to be displayed in a background of the extended reality rendered content feed. For example, the mapping component may determine that information identifying a geolocation, near the actor identified in the feeder content, is included in the structured format of the feeder content, and may map the geolocation to the background of the extended reality rendered content feed. As another example, if the content structure component identified one or more housing options as objects in the feeder content, the mapping component may map the one or more housing options, as well as the identified geolocation, onto the background of the extended reality rendered content feed.

The foreground mapping may include information identifying one or more objects, one or more geolocations, one or more actions, and/or the like, identified and/or associated with the feeder content, that are to be displayed in a foreground of the extended reality rendered content feed. For example, the mapping component may determine that information identifying a home mortgage options document and a home mortgage processing action are included in the structured format of the feeder content, and may map the home mortgage options document and the home mortgage processing action to the foreground of the extended reality rendered content feed.

In some implementations, the mapping component may use artificial intelligence and/or a machine learning algorithm to generate a machine learning model for the one or more semantic mappings. For example, the machine learning algorithm may be any of the machine learning algorithms described above. The mapping component may train the machine learning model on historical semantic mapping data for similar feeder content. For example, the historical semantic mapping data may include one or more historical emotional mappings, one or more historical background mappings, one or more historical foreground mappings, and/or the like.

In some implementations, the mapping component may perform a training operation by portioning the historical semantic mapping data into a training set, a validation set, a test set, and/or the like. For example, the mapping component may use an unsupervised training procedure based on the training set of historical semantic mapping data. The mapping component may perform a dimensional reduction to reduce the historical semantic mapping data to a minimum feature set, thereby reducing processing to train the machine learning model for the one or more semantic mappings and may apply a classification technique to the minimum feature set.

In some implementations, the mapping component may use a logistic regression classification technique to determine a categorical outcome (e.g., that a particular actor, object, geolocation, and/or the like, is to be included in a semantic mapping). Additionally, or alternatively, the mapping component may use a naïve Bayesian classifier technique. In this case, the mapping component may perform binary recursive partitioning to split the data of the minimum feature set into partitions and/or branches and use the partitions and/or branches to perform predictions (e.g., that a particular actor, object, geolocation, and/or the like, is to be included in a semantic mapping). Based on using recursive partitioning, the mapping component may reduce utilization of computing resources relative to manual, linear sorting and analysis of data points, thereby enabling use of thousands, millions, or billions of data points to train a model, which may result in a more accurate model than using fewer data points.

Additionally, or alternatively, the mapping component may use a support vector machine (SVM) classifier technique to generate a non-linear boundary between data points in the training set. In this case, the non-linear boundary is used to classify test data (e.g., data relating to the one or more semantic mappings) into a particular class (e.g., a class indicating that a particular actor, object, geolocation, and/or the like, is to be included in a background semantic mapping, that a particular actor, object, geolocation, and/or the like, is to be included in a foreground mapping, that a particular actor, object, geolocation, and/or the like, is to be included in an emotional semantic mapping, and/or the like).

Additionally, or alternatively, the mapping component may train the model of the one or more semantic mappings using a supervised training procedure that includes receiving input to the model from a subject matter expert, which may reduce an amount of time, an amount of processing resources, and/or the like to train the model of the one or more semantic mappings relative to an unsupervised training procedure. In some implementations, the mapping component may use one or more other model training techniques, such as a neural network technique, a latent semantic indexing technique, and/or the like. For example, the mapping component may perform an artificial neural network processing technique (e.g., using a two-layer feedforward neural network architecture, a three-layer feedforward neural network architecture, and/or the like) to perform pattern recognition with regard to patterns of whether one or more objects, actors, geolocations, and/or the like, described using different semantic descriptions are to be included in a particular semantic mapping or not. In this case, using the artificial neural network processing technique may improve an accuracy of a model (e.g., the model of the one or more semantic mappings) generated by the mapping component by being more robust to noisy, imprecise, or incomplete data, and by enabling the mapping component to detect patterns and/or trends undetectable to human analysts or systems using less complex techniques.

As an example, the mapping component may use a supervised multi-label classification technique to train the model. For example, as a first step, the mapping component may map one or more objects, actors, geolocations, and/or the like, to a particular semantic mapping. In this case, the objects, actors, geolocations, and/or the like may be included in a particular semantic mapping based on characteristics of the objects, actors, geolocations, and/or the like (e.g., whether the objects, actors, geolocations, and/or the like is similar or associated with a background, a foreground, an emotion, and/or the like) and an analysis of the objects, actors, geolocations, and/or the like (e.g., by a technician, thereby reducing processing relative to the mapping component being required to analyze each activity). As a second step, the mapping component may determine classifier chains, whereby labels of target variables may be correlated (e.g., in this example, labels may be the objects, actors, geolocations, and/or the like and correlation may refer to a common semantic mapping). In this case, the mapping component may use an output of a first label as an input for a second label (as well as one or more input features, which may be other data relating to the objects, actors, geolocations, and/or the like), and may determine a likelihood that a particular object, actor, geolocation, and/or the like, are to be included in a particular semantic mapping based on a similarity to other objects, actors, geolocations, and/or the like are included in a similar semantic mapping. In this way, the mapping component transforms classification from a multilabel-classification problem to multiple single-classification problems, thereby reducing processing utilization. As a third step, the mapping component may determine a Hamming Loss Metric relating to an accuracy of a label in performing a classification by using the validation set of the data. For example, an accuracy with which a weighting applied to each particular object, actor, geolocation, and/or the like and whether each particular object, actor, geolocation, and/or the like is associated with a particular semantic mapping or not, results in a correct prediction of whether the particular object, actor, geolocation, and/or the like is to be included in the particular semantic mapping, thereby accounting for differing amounts to which association of any one particular object, actor, geolocation, and/or the like influences the one or more semantic mappings. As a fourth step, the mapping component may finalize the model based on labels that satisfy a threshold accuracy associated with the Hamming Loss Metric and may use the model for subsequent prediction of whether the objects, actors, geolocations, and/or the like are to be included in a particular semantic mapping. Accordingly, the mapping component may use any number of artificial intelligence techniques, machine learning techniques, deep learning techniques, and/or the like to generate the one or more semantic mappings.

In some implementations, the mapping component may assign a confidence score, using the machine learning model, to the one or more semantic mappings, wherein the confidence score indicates a likelihood (e.g., a percentage, an index value, and/or the like) that the machine learning algorithm correctly mapped the one or more objects, actors, geolocations, actions, and/or the like, identified in the structured format of the feeder data, onto the one or more semantic mapping types. In some implementations, a user may provide feedback for the one or more semantic mappings to the mapping component, and the mapping component may refine the machine learning model based on the feedback provided by the user. In this way, the mapping component may improve the ability of the immersive content platform to generate the one or more semantic mappings, as well as reduce the amount of processing and/or memory resources used to generate the semantic mappings.

Figure 1C:
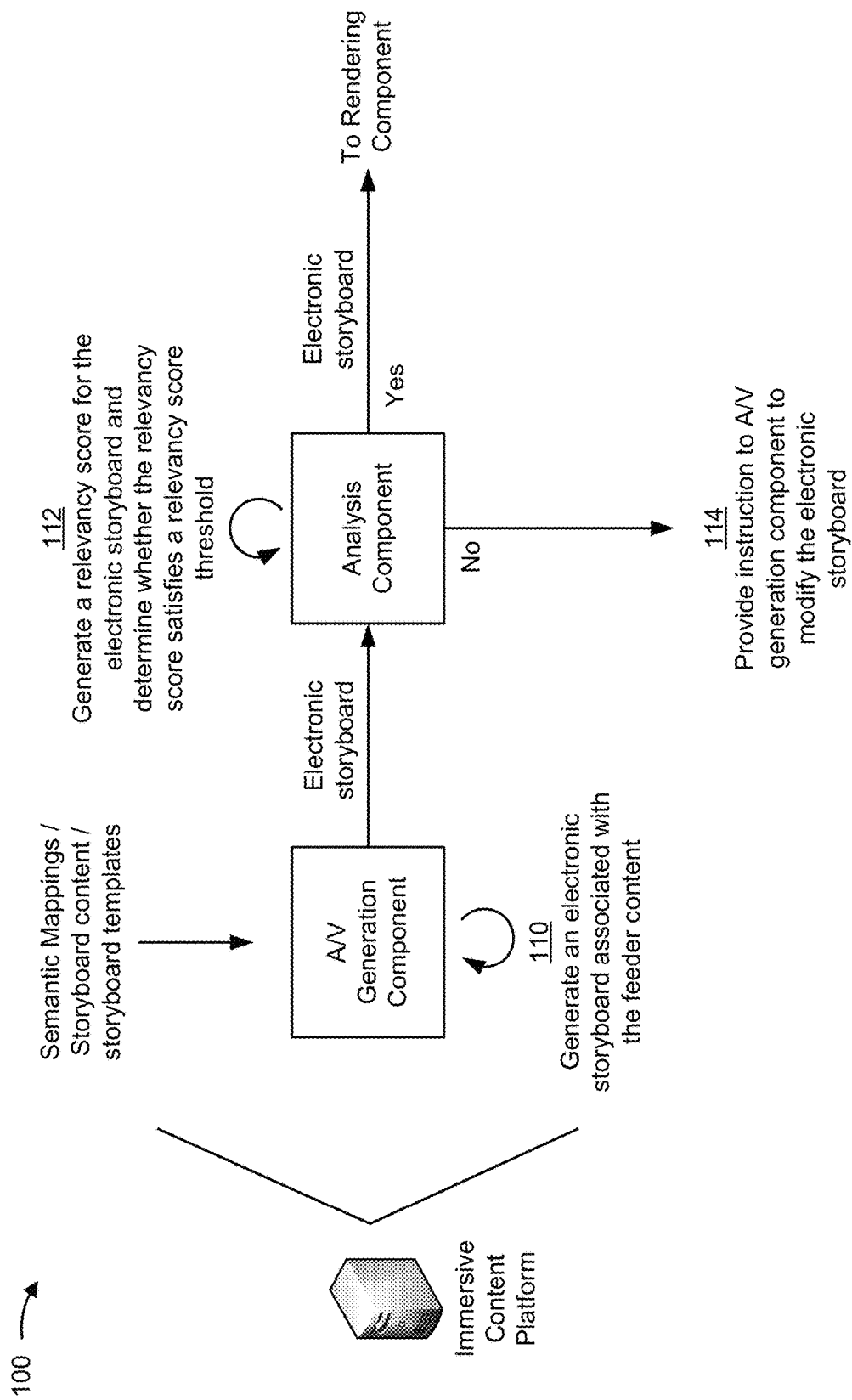

Turning to FIG. 1C, the mapping component may provide the one or more semantic mappings for the feeder content to the A/V generation component. As shown by reference number 110, the A/V generation component may generate an electronic storyboard for the feeder content. For example, the A/V generation component may generate the electronic storyboard based on the one or more semantic mappings for the feeder content. The electronic storyboard may include a sequence of images that represent one or more actions identified in the structured format of the feeder content. For example, an electronic storyboard that represents a house tour action may include a sequence of images that represent an actor approaching a house to be toured, the actor moving through various areas in and/or around the house, and/or the like.

To generate the electronic storyboard, the A/V generation component may identify (e.g., based on the feeder content, based on the structured format of the feeder content, based on the one or more semantic mappings, and/or the like) a storyboard template of a plurality of storyboard templates. A storyboard template may specify a particular sequence of images that are to be included in a particular electronic storyboard. In some implementations, the A/V generation component may identify the storyboard template based on the one or more actions identified in the structured format of the feeder content. For example, the A/V generation component may identify a house purchase action that is identified in the structured format of the feeder content, and accordingly may identify a storyboard template associated with a house purchase action. In some implementations, the A/V generation component may identify a plurality of storyboard templates, where each storyboard template, of the plurality of storyboard templates, is associated with a particular action that is identified in the structured format of the feeder content. For example, the A/V generation component may determine that the structured format of the feeder content identifies a house tour action, identifies an obtaining a mortgage action, and identifies a house purchase closing action, and may therefore identify a storyboard template for the house tour action, a storyboard template for the obtaining the mortgage action, and a storyboard template for the house purchase closing action.

The A/V generation component may identify storyboard content that is to be included in the electronic storyboard. For example, the A/V generation component may identify the storyboard content based on the one or more semantic mappings, based on the storyboard template, and/or the like. In some implementations, the A/V generation component may obtain the storyboard content from a storyboard data store, which may be included in the immersive content platform, the server device, and/or another location. The storyboard content may include images, sounds, videos, and/or the like, that are associated with the one or more actions, actors, objects, geolocations, and/or the like, identified in the structured format of the feeder content; that are associated with the one or more semantic mappings of the feeder content; and/or the like. For example, the storyboard content may include images of actual geolocations, objects, and/or actors (e.g., if a geolocation is an actual town, the storyboard content may include one or more images of the actual town), may include generic and/or stock images of geolocations, objects, and/or actors, and/or the like. The A/V generation component may identify the storyboard content using various techniques, such as keyword searching (e.g., based on the one or more words identified in the feeder content), searching based on the one or more tokens assigned to the one or more words, searching based on semantic mapping types, and/or the like.

The A/V generation component may generate the electronic storyboard by incorporating the storyboard content into the electronic storyboard to generate the sequence of images. For example, in each image, of the sequence of images, the A/V generation component may include one or more images (e.g., from the storyboard content) in a background of the image, may overlay one or more images (e.g., from the storyboard content) in a foreground of the image, and/or the like.

As further shown in FIG. 1B, the A/V generation component may ensure that the electronic storyboard is relevant to the feeder content by providing the electronic storyboard to the analysis component. As shown by reference number 112, the analysis component may generate a storyboard relevancy score for the electronic storyboard, may compare the relevancy score for the electronic storyboard with a storyboard relevancy score threshold (e.g., 85%, 90%, and/or the like), and, as shown by reference number 114, may provide an instruction to the A/V generation component to modify the electronic storyboard if the storyboard relevancy score does not satisfy the storyboard relevancy score threshold.

The analysis component may generate the storyboard relevancy score by generating a structured format of the electronic storyboard by extracting the objects, actors, actions, geolocations represented in the electronic storyboard; by generating one or more semantic mappings for the electronic storyboard (e.g., one or more emotional mappings, background mappings, foreground mappings, and/or the like) represented in the electronic storyboard, and/or the like. The analysis component may use computer vision techniques and/or other image analysis techniques, such as optical character recognition (OCR) and/or the like, to extract the objects, actors, actions, geolocations, emotional mappings, background mappings, foreground mappings, and/or the like. The analysis component may compare the extracted objects, actors, actions, and/or geolocations identified in the structured format of the electronic storyboard with the objects, actors, actions, and/or geolocations identified in the structured format of the feeder data, may compare the extracted emotional mappings, background mappings, and/or foreground mappings identified in the one or more semantic mappings of the electronic storyboard with the emotional mappings, background mappings, and/or foreground mappings identified in the one or more semantic mappings of the feeder content, and may determine a percentage match. In some implementations, the analysis component may generate a storyboard relevancy score for each of the objects, actors, actions, geolocations, emotional mappings, background mappings, and foreground mappings.

As stated above, the analysis component may determine whether the storyboard relevancy score satisfies the storyboard relevancy score threshold, and may provide an instruction to the A/V generation component to modify the electronic storyboard based on determining that the storyboard relevancy score does not satisfy the storyboard relevancy score threshold. The A/V generation component may modify the electronic storyboard by replacing an image represented in the background of a storyboard image, by replacing an image of an actor represented in a foreground of a storyboard image, replacing an image of one or more objects represented in a storyboard image, and/or the like. In some implementations, the A/V generation component may use the determination of whether the storyboard relevancy score satisfies the storyboard relevancy score threshold to refine the criteria the A/V generation component uses to identify the storyboard content that is to be incorporated into the electronic storyboard.

As further shown in FIG. 1C, if the analysis component determines that the storyboard relevancy score satisfies the storyboard relevancy score threshold, the analysis component may provide the electronic storyboard to the rendering component.

Figure 1D:
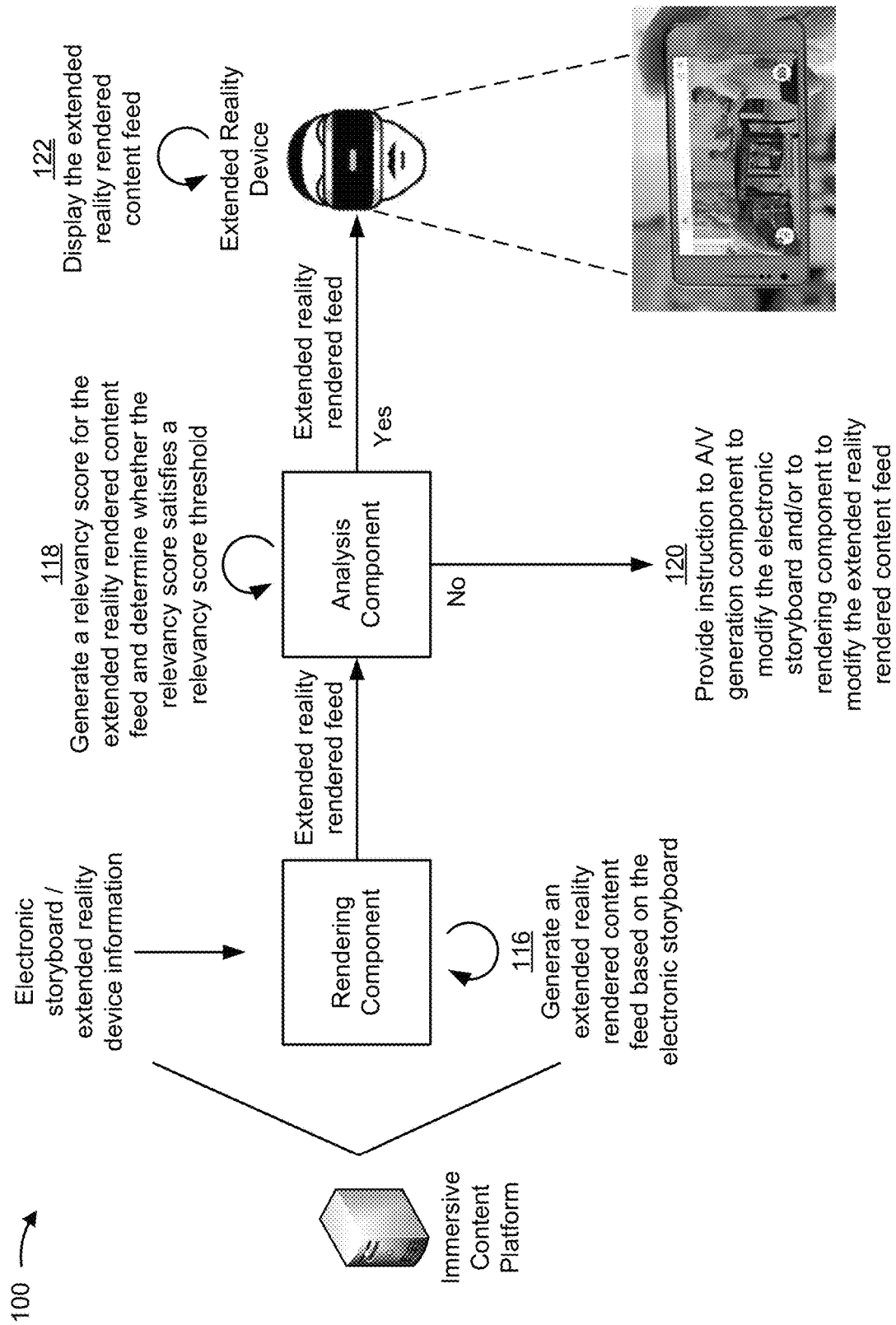

Turning to FIG. 1D, the rendering component may receive the electronic storyboard. As shown by reference number 116, the rendering component may generate an extended reality rendered content feed based on the electronic storyboard. In some implementations, the extended reality rendered content feed may be an augmented reality video generated from the electronic storyboard, may be an augmented reality overlay (e.g., a graphical representation of the electronic storyboard to be overlaid on a live and/or real-time camera feed captured by the extended reality device) generated from the electronic storyboard, may be a virtual reality video generated from the electronic storyboard, may be a virtual reality interactive environment (e.g., such as where a user of the extended reality device may virtually tour a house via the extended reality rendered content feed and/or the like), may be a mixed reality video generated from the electronic storyboard, and/or the like. For example, the augmented reality overlay may provide a user of the extended reality device with indicators of navigation instructions, which instruct the user where to travel (e.g., to a financial institution to obtain a house mortgage), who to talk to (e.g., a mortgage officer at the financial institution), which objects to interact with (e.g., a mortgage application), and/or the like.

In some implementations, the rendering component may generate the extended reality rendered content feed based on the extended reality device information received from the extended reality device. For example, the rendering component may generate the extended reality rendered content feed based on an extended reality device type, associated with the extended reality device, identified in the extended reality device information. As an example, the extended reality device information may include information identifying the extended reality device type as an augmented reality device type, and the rendering component may accordingly generate an augmented reality rendered content feed. As another example, the extended reality device information may include information identifying the extended reality device type as a virtual reality device type, and the rendering component may accordingly generate a virtual reality rendered content feed. In some implementations, the rendering component may generate both an augmented reality rendered content feed and a virtual reality rendered content feed based on the electronic storyboard so that a user may select which type of extended reality rendered content feed to view.

The rendering component may specify and/or adjust one or more parameters of the extended reality rendered content feed based on the extended reality device information. For example, the rendering component may utilize a light estimation output, for the extended reality device, included in the extended reality device information in order to determine a level of transparency of the representations included in the extended reality rendered content feed, to determine a level of brightness of the representations included in the extended reality rendered content feed, and/or the like. In some implementations, the rendering component may utilize spatial information (e.g., information associated with one or more environmental objects included in the real world environment, information identifying an estimated space of the real world environment, etc.), included in the extended reality device information, to determine a size of the representations included in the extended reality rendered content feed, to determine a placement of the representations included in the extended reality rendered content feed, and/or the like.

To generate the extended reality rendered content feed, the rendering component may generate one or more three-dimensional representations, one or more holographic representations, one or more graphical overlay representations, and/or the like, of the objects, actors, geolocations, actions, emotional mappings. background mappings. foreground mappings, and/or the like, represented by the electronic storyboard. In some implementations, the rendering component may use various techniques to extract the objects, actors, geolocations, actions, emotional mappings, background mappings, foreground mappings, and/or the like, represented in the electronic storyboard, such as analyzing the one or more images of the electronic storyboard using optical character recognition (OCR), analyzing the one or more images included in the electronic storyboard using a convolutional neural network, using scene cut detection as a pre-processing step to reduce the computation costs and then localizing the position and boundary of the objects in the one or more images of the electronic storyboard, and/or the like.

In some implementations, instead of, and/or in addition to, generating the one or more three-dimensional representations, one or more holographic representations, one or more graphical overlay representations, and/or the like, the rendering component may identify the one or more three-dimensional representations, one or more holographic representations, one or more graphical overlay representations, and/or the like, in an extended reality content store, and may incorporate the one or more three-dimensional representations, one or more holographic representations, one or more graphical overlay representations, and/or the like, into the extended reality rendered content feed. In this way, the immersive content platform conserves computing and/or memory resources relative to generating the one or more three-dimensional representations, one or more holographic representations, one or more graphical overlay representations, and/or the like, by identifying one or more three-dimensional representations, one or more holographic representations, one or more graphical overlay representations, and/or the like, that have already been generated.

As further shown in FIG. 1D, the rendering component may provide the extended reality rendered content feed to the analysis component. As shown by reference number 118, the analysis component may generate a content feed relevancy score for the extended reality rendered content feed and may determine whether the content feed relevancy score satisfies a content feed relevancy score threshold (e.g., 85%, 90%, and/or the like). For example, the analysis component may generate a structured format of the extended reality rendered content feed, may generate one or more semantic mappings for the extended reality rendered content feed, may compare the structured format of the extended reality rendered content feed with the structured format of the feeder content to determine a similarity (e.g., a percentage match and/or the like), may compare the one or more semantic mappings for the extended reality rendered content feed with the one or more semantic mappings for the feeder content to determine a similarity (e.g., a percentage match and/or the like), and/or the like, similar as described above in reference to the storyboard relevancy score. In some implementations, the storyboard relevancy score threshold may be the same as the content feed relevancy threshold or may be different than the content feed relevancy threshold.

As further shown in FIG. 1D, and as shown by reference number 120, the analysis component may provide an instruction to the A/V generation component to modify the electronic storyboard and/or may provide an instruction to the rendering component to modify the extended reality rendered content feed. For example, the A/V generation component may modify the electronic storyboard similar as described above. As another example, the rendering component may modify the extended reality rendered content feed by replacing one or more three-dimensional representations, one or more holographic representations, one or more graphical overlay representations, and/or the like, in the extended reality rendered content feed. In some implementations, the rending component may use the determination of whether the content feed relevancy score satisfies the content feed relevancy score threshold to refine the criteria the rendering component uses to generate and/or identify the one or more three-dimensional representations, one or more holographic representations, one or more graphical overlay representations, and/or the like, that are to be incorporated into the extended reality rendered content feed.

As further shown in FIG. 1D, the analysis component may transmit the extended reality rendered content feed to the extended reality device based on determining that the relevancy score for the extended reality rendered content satisfies the threshold relevancy score. In some implementations, the analysis component may automatically provide the extended reality rendered content feed to the extended reality device based on determining that the relevancy score satisfies the relevancy score threshold. In some implementations, the immersive content platform may store the extended reality rendered content feed at the immersive content platform, the server device, and/or another location and transmit the extended reality rendered content feed to the extended reality device based on receiving an input to provide the extended reality rendered content feed to the extended reality device, and/or the like. For example, a user of the extended reality device may provide an input, via a client device, as a request for the extended reality rendered content feed, and the immersive content platform may provide the extended reality rendered content feed to the extended reality device based on receiving the request.

In some implementations, the extended reality device may display the extended reality rendered content feed. In this way, the user of the extended reality device may view the extended reality rendered content feed, may interact with the extended reality rendered content feed, and/or the like. For example, the user may interact with the extended reality rendered content feed using various gestures, voice input, input via one or more input devices, and/or the like, to manipulate, modify, navigate, and/or change the extended reality rendered content feed. For example, the user may interact with the extended reality rendered content feed by using hand gestures (e.g., a swiping gesture to rotate the extended reality rendered content feed, a pinch gesture to zoom the extended reality rendered content feed, etc.), by using voice command (e.g., a voice command to focus in on a particular area in the extended reality rendered content feed, etc.), and/or the like.

In some implementations, the immersive content platform may receive an input associated with a user interaction with the extended reality rendered content feed. For example, the immersive content platform may detect the interaction (e.g., a gesture, a voice command, an input via an input device, etc.), and determine whether the interaction is associated with one or more actions that are associated with the extended reality rendered content feed. Based on determining that the interaction is associated with one or more actions that are associated with the extended reality rendered content feed, the immersive content platform may generate a modified (e.g., a modified, manipulated, new, etc.) extended reality rendered content feed based on the one or more actions. For example, the immersive content platform may determine that the interaction is associated with a zoom action, and thus the interaction component may modify the extended reality rendered content feed by zooming in the extended reality rendered content feed. As another example, the immersive content platform may receive the input from a camera associated with the extended reality device (e.g., input in the form of live and/or real-time video capture). For example, when the extended reality rendered content feed is an augmented reality overlay that provides the user with navigation instructions, the camera associated with the extended reality device may provide a live video capture.

The immersive content platform may provide the modified extended reality rendered content feed to the extended reality device. As shown by reference number 122, the extended reality device may display the modified extended reality rendered content feed, and the user may view the modified extended reality rendered content feed, may interact with the modified extended reality rendered content feed, and/or the like. For example, based on receiving a live video capture from the camera associated with the extended reality device, the immersive content platform may determine that the user has reached a location associated with the navigation instructions provided the extended reality rendered content feed, and may update the extended reality rendered content feed to display the next navigation instruction to the user.

In this way, the immersive content platform may automatically create an immersive extended reality rendered content feed for the feeder content. In this way, several different stages of the process for generating the extended reality rendered content feed are automated, which may remove human subjectivity and waste from the process, and which may improve speed and efficiency of the process and conserve computing resources (e.g., processor resources, memory resources, and/or the like). Furthermore, implementations described herein use a rigorous, computerized process to perform tasks or roles that were not previously performed or were previously performed using subjective human intuition or input. For example, currently there does not exist a technique to generate the extended reality rendered content feed using machine learning and artificial intelligence. As another example, the immersive content platform may use various relevancy checks throughout the process of generating the extended reality rendered content feed, which reduces and/or eliminates waste in the process caused by subjective human intuition or input. Finally, automating the process for generating the extended reality rendered content feed conserves computing resources (e.g., processor resources, memory resources, and/or the like) that would otherwise be wasted in attempting to manually identify and select representations of objects to be included in a storyboard for the extended reality rendered content feed, in attempting to manually identify and select representations of objects to be included in the extended reality rendered content feed, and/or the like.

As indicated above, FIGS. 1A-1D is provided merely as an example. Other examples are possible and may differ from what was described with regard to FIGS. 1A-1D.

Figure 2:
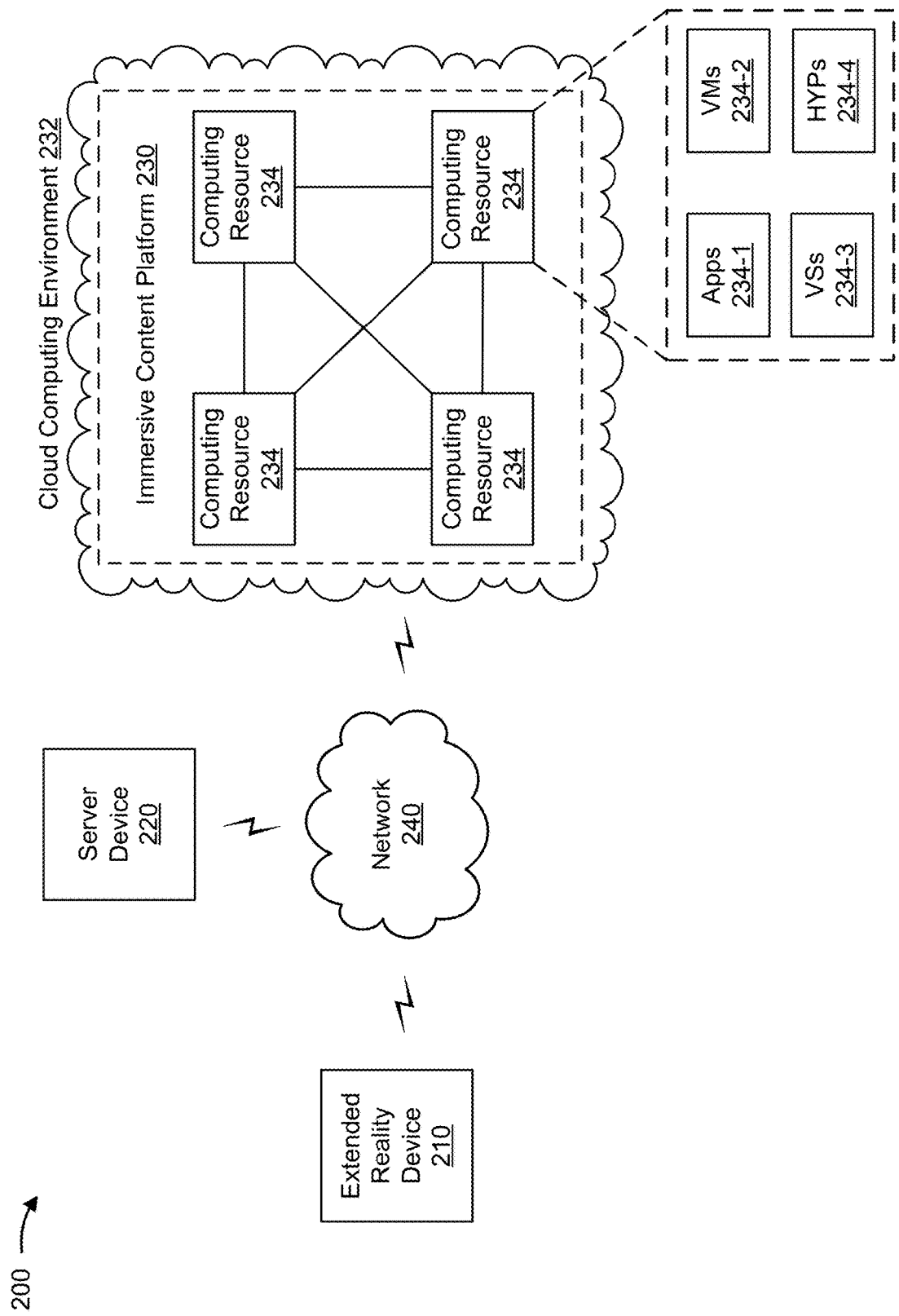
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include an extended reality device 210, a server device 220, an immersive content platform 230, a network 240, and/or the like. Devices of environment 200 may interconnect via wired connections, wireless connections, or a combination of wired and wireless connections.

Extended reality device 210 includes one or more devices capable of receiving, generating, storing, processing, and/or providing information, such as information described herein. For example, extended reality device 210 may receive information from and/or transmit information to immersive content platform 230, server device 220, and/or the like.

In some implementations, extended reality device 210 may include an augmented reality device, a virtual reality device, a mixed reality device, a gaming device, a wearable communication device (e.g., a smart wristwatch, a pair of smart eyeglasses, etc.), or a similar type of device. In some implementations, extended reality device 210 may be a hand-held device, a head-mounted device, another type of wearable device, and/or the like. In some implementations, extended reality device 210 may receive an extended reality rendered content feed based on an electronic storyboard of feeder content, may display the extended reality rendered content feed, may receive an input associated with the extended reality rendered content feed, may provide the input to immersive content platform 230, may receive a modified extended reality rendered content feed, may display the extended reality rendered content feed, and/or the like.

Server device 220 includes one or more devices capable of receiving, generating, storing, processing, and/or providing information, such as information described herein. For example, server device 220 may include a laptop computer, a tablet computer, a desktop computer, a server device, a group of server devices, or a similar type of device, which provides feeder content, storyboard templates, storyboard content, extended reality content, and/or the like, to immersive content platform 230. In some implementations, server device 220 may receive information from and/or transmit information to extended reality device 210 and/or immersive content platform 230.

Immersive content platform 230 includes one or more devices capable of automatically creating an immersive extended reality rendered content feed for display by extended reality device 210. For example, immersive content platform 230 may include one or more devices capable of receiving information from server device 220, from extended reality device 210, and/or the like; capable of generating an extended reality rendered content feed; capable of providing the extended reality rendered content feed to extended reality device 210, server device 220, and/or the like; capable of receiving an input, associated with the extended reality rendered content feed, from extended reality device 210 and/or another input device; capable of updating and/or modifying the extended reality rendered content feed; and/or the like.

In some implementations, immersive content platform 230 may be designed to be modular such that certain software components may be swapped in or out depending on a particular need. As such, immersive content platform 230 may be easily and/or quickly reconfigured for different uses. In some implementations, immersive content platform 230 may receive information from and/or transmit information to extended reality device 210 and/or server device 220.

In some implementations, as shown, immersive content platform 230 may be hosted in a cloud computing environment 232. Notably, while implementations described herein describe immersive content platform 230 as being hosted in cloud computing environment 232, in some implementations, immersive content platform 230 may not be cloud-based (i.e., may be implemented outside of a cloud computing environment) or may be partially cloud-based. Cloud computing environment 232 includes an environment that hosts immersive content platform 230. Cloud computing environment 232 may provide computation, software, data access, storage, etc. services that do not require end-user knowledge of a physical location and configuration of system(s) and/or device(s) that hosts immersive content platform 230. As shown, cloud computing environment 232 may include a group of computing resources 234 (referred to collectively as "computing resources 234" and individually as "computing resource 234").

Computing resource 234 includes one or more personal computers, workstation computers, server devices, or other types of computation and/or communication devices. In some implementations, computing resource 234 may host immersive content platform 230. The cloud resources may include compute instances executing in computing resource 234, storage devices provided in computing resource 234, data transfer devices provided by computing resource 234, etc. In some implementations, computing resource 234 may communicate with other computing resources 234 via wired connections, wireless connections, or a combination of wired and wireless connections.

As further shown in FIG. 2, computing resource 234 includes a group of cloud resources, such as one or more applications ("APPs") 234-1, one or more virtual machines ("VMs") 234-2, virtualized storage ("VSs") 234-3, one or more hypervisors ("HYPs") 234-4, and/or the like.

Application 234-1 includes one or more software applications that may be provided to or accessed by extended reality device 210. Application 234-1 may eliminate a need to install and execute the software applications on extended reality device 210. For example, application 234-1 may include software associated with immersive content platform 230 and/or any other software capable of being provided via cloud computing environment 232. In some implementations, one application 234-1 may send/receive information to/from one or more other applications 234-1, via virtual machine 234-2.

Virtual machine 234-2 includes a software implementation of a machine (e.g., a computer) that executes programs like a physical machine. Virtual machine 234-2 may be either a system virtual machine or a process virtual machine, depending upon use and degree of correspondence to any real machine by virtual machine 234-2. A system virtual machine may provide a complete system platform that supports execution of a complete operating system ("OS"). A process virtual machine may execute a single program, and may support a single process. In some implementations, virtual machine 234-2 may execute on behalf of a user (e.g., a user of extended reality device 210 or an operator of immersive content platform 230), and may manage infrastructure of cloud computing environment 232, such as data management, synchronization, or long-duration data transfers.

Virtualized storage 234-3 includes one or more storage systems and/or one or more devices that use virtualization techniques within the storage systems or devices of computing resource 234. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 234-4 may provide hardware virtualization techniques that allow multiple operating systems (e.g., "guest operating systems") to execute concurrently on a host computer, such as computing resource 234. Hypervisor 234-4 may present a virtual operating platform to the guest operating systems, and may manage the execution of the guest operating systems. Multiple instances of a variety of operating systems may share virtualized hardware resources.

Network 240 includes one or more wired and/or wireless networks. For example, network 240 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
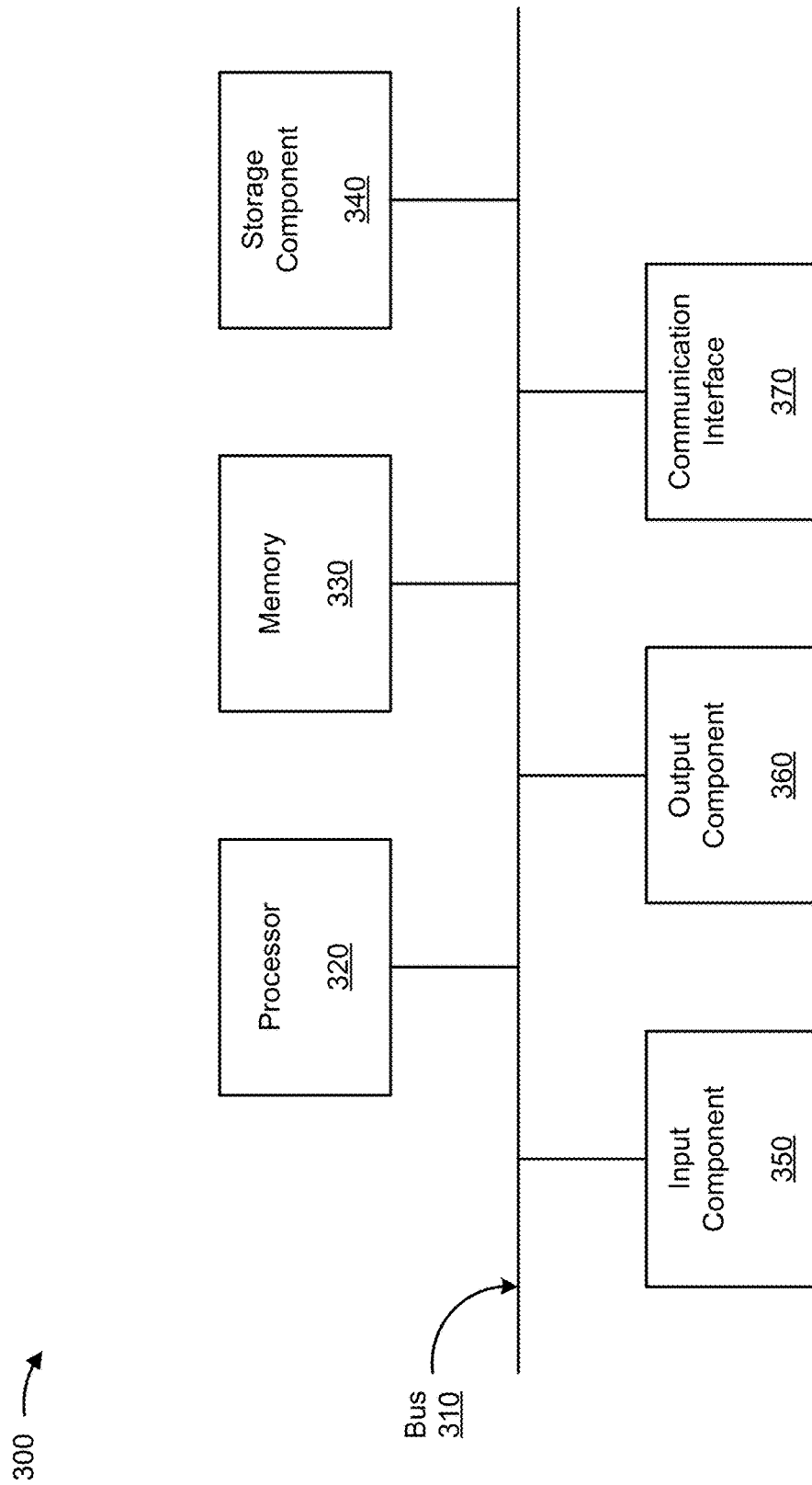
FIG. 3 is a diagram of example components of one or more devices of FIG. 2.

FIG. 3 is a diagram of example components of a device 300. Device 300 may correspond to extended reality device 210, server device 220, immersive content platform 230, computing resource 234, and/or one or more devices included in network 240. In some implementations, extended reality device 210, server device 220, immersive content platform 230, computing resource 234, and/or one or more devices included in network 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
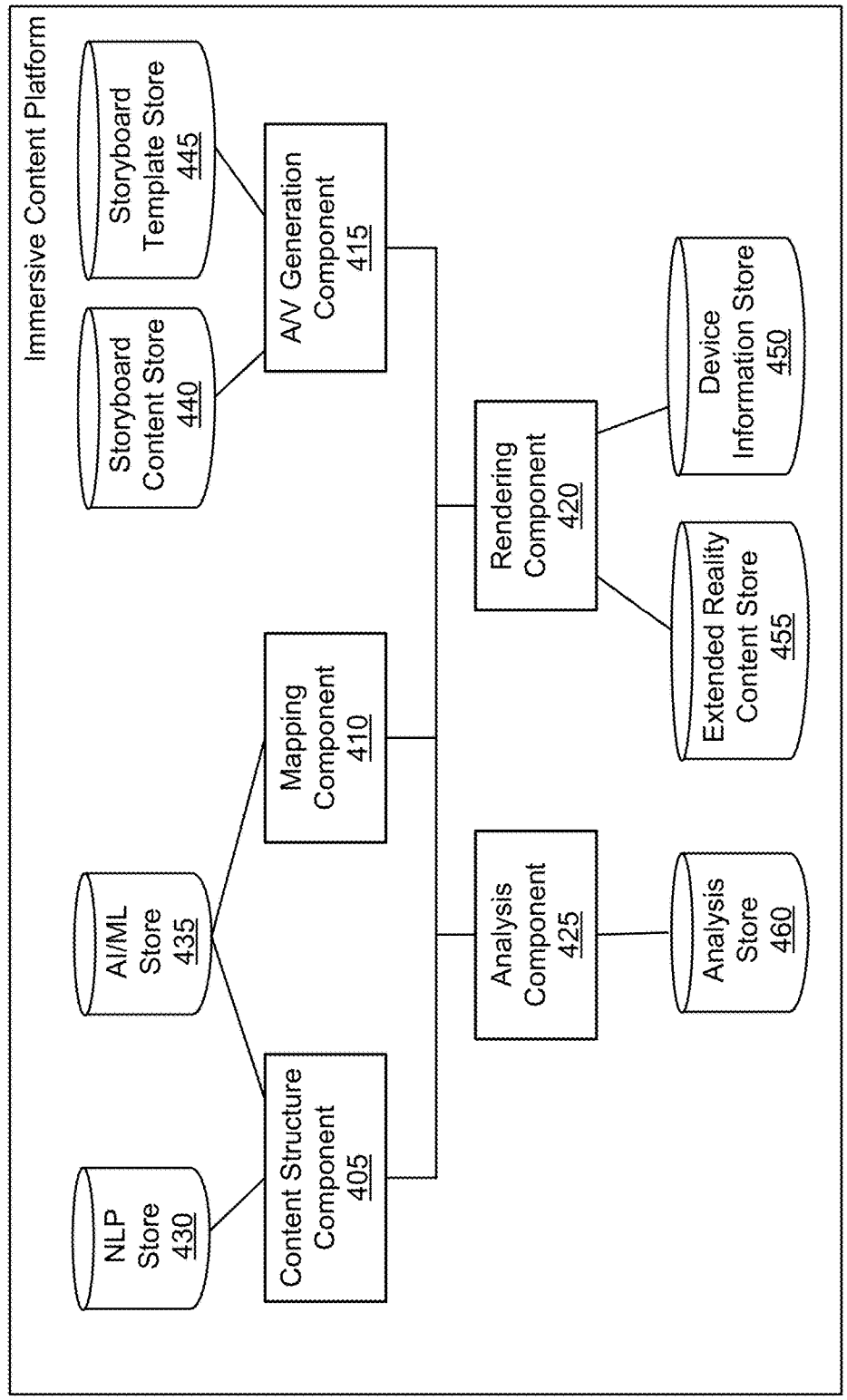
FIG. 4 is a diagram of an example immersive content platform of FIG. 2.

FIG. 4 is a diagram of an example immersive content platform (e.g., immersive content platform 400), as described herein. The immersive content platform may generate an immersive extended reality rendered content feed for display be an extended reality device (e.g., extended reality device 210 of FIG. 2), as described herein. In some implementations, immersive content platform may be implemented by immersive content platform 230 of FIG. 2, by device 300 of FIG. 3, and/or the like.

As shown in FIG. 4, immersive content platform 400 may include various components, such as a content structure component 405, a mapping component 410, an A/V generation component 415, a rendering component 420, an analysis component 425, a natural language processing (NLP) store 430, an artificial intelligence and machine learning (AI/ML) store 435, a storyboard template store 440, a storyboard content store 445, a device information store 450, an extended reality content store 455, an analysis store 460, and/or the like. In some implementations, the components included in FIG. 4 may be implemented by separate components and/or devices, may be included in the same component and/or device, and/or the like.

Content structure component 405 may generate a structured format of feeder content (e.g., feeder content received from a server device, feeder content received from a client device, feeder content received from an extended reality device, and/or the like). For example, content structure component 405 may generate the structured format of feeder content as described above in reference to FIGS. 1A-1D. In some implementations, content structure component 405 may generate the structured format of feeder content using one or more natural language processing algorithms stored in NLP store 430, may generate the structured format of feeder content using artificial intelligence and/or one or more machine learning algorithms stored in AWL store 435 (e.g., any of the artificial intelligence and/or machine learning algorithms described above in FIGS. 1A-1D), and/or the like.

Mapping component 410 may generate one or more semantic mappings for the feeder content based on the structured format of the feeder content. For example, mapping component 410 may generate the one or more semantic mappings as described above in reference to FIGS. 1A-1D. In some implementations, mapping component 410 may generate the one or more semantic mappings using artificial intelligence and/or one or more machine learning algorithms stored in AWL store 435 (e.g., any of the artificial intelligence and/or machine learning algorithms described above in FIGS. 1A-1D), and/or the like.

A/V generation component 415 may generate an electronic storyboard for the feeder content based on the one or more semantic mappings, based on the structured format of the feeder data, and/or the like. For example, A/V generation component 415 may generate the electronic storyboard as described above in FIGS. 1A-1D. In some implementations, A/V generation component 415 may generate the electronic storyboard using a storyboard template stored in storyboard template store 440. In some implementations, A/V generation component may generate the electronic storyboard by incorporating storyboard content (e.g., such as the storyboard content described above in FIGS. 1A-1D), stored in storyboard content store 445, into the electronic storyboard.

Rendering component 420 may generate an extended reality rendered content feed based on the electronic storyboard of the feeder content. For example, rendering component 420 may generate the extended reality rendered content feed as described above in FIGS. 1A-1D. In some implementations, rendering component 420 may generate the extended reality rendered content feed based on extended reality device information, associated with the extended reality device, stored in device information store 450 (e.g., any of the extended reality device information described above in FIGS. 1A-1D). In some implementations, rendering component 420 may generate the extended reality rendered content feed by generating one or more three-dimensional representations, one or more holographic representations, one or more graphical overlay representations, and/or the like, to be incorporated into the extended reality rendered content feed, by identifying the one or more three-dimensional representations, one or more holographic representations, one or more graphical overlay representations, and/or the like, stored in extended reality rendered content store 455, and/or the like.

Analysis component 425 may generate an electronic storyboard relevancy score for the electronic storyboard, may determine whether the electronic storyboard relevancy score satisfies an electronic storyboard relevancy score threshold, may generate a content feed relevancy score for the extended reality rendered content feed, may determine whether the content feed relevancy score satisfies a content feed relevancy score threshold, and/or the like. For example, analysis component 425 may generate the electronic storyboard relevancy score for the electronic storyboard, and may determine whether the electronic storyboard relevancy score satisfies the electronic storyboard relevancy score threshold as described above in FIGS. 1A-1D. As another example, analysis component 425 may generate the content feed relevancy score for the extended reality rendered content feed, and may determine whether the content feed relevancy score satisfies the content feed relevancy score threshold as described above in FIGS. 1A-1D. In some implementations, analysis component 425 may store the electronic storyboard relevancy score, the content feed relevancy score, and/or the like, along with other electronic storyboard relevancy scores, content feed relevancy scores, and/or the like, in analysis store 460. In some implementations, analysis component 425 may analyze the electronic storyboard relevancy scores, the content feed relevancy scores, and/or the like, stored in analysis store 460, to identify trends in the electronic storyboard relevancy scores, in the content feed relevancy scores, and/or the like, to determine modifications to the artificial intelligence and/or machine learning algorithms stored in AI/ML store 435, which increases the accuracy and/or efficiency of the artificial intelligence and/or machine learning algorithms.

The number and arrangement of components shown in FIG. 4 are provided as an example. In practice, immersive content platform 400 may include additional components, fewer components, different components, or differently arranged components than those shown in FIG. 4. Additionally, or alternatively, a set of components (e.g., one or more components) of immersive content platform 400 may perform one or more functions described as being performed by another set of components of immersive content platform 400.

Figure 5:
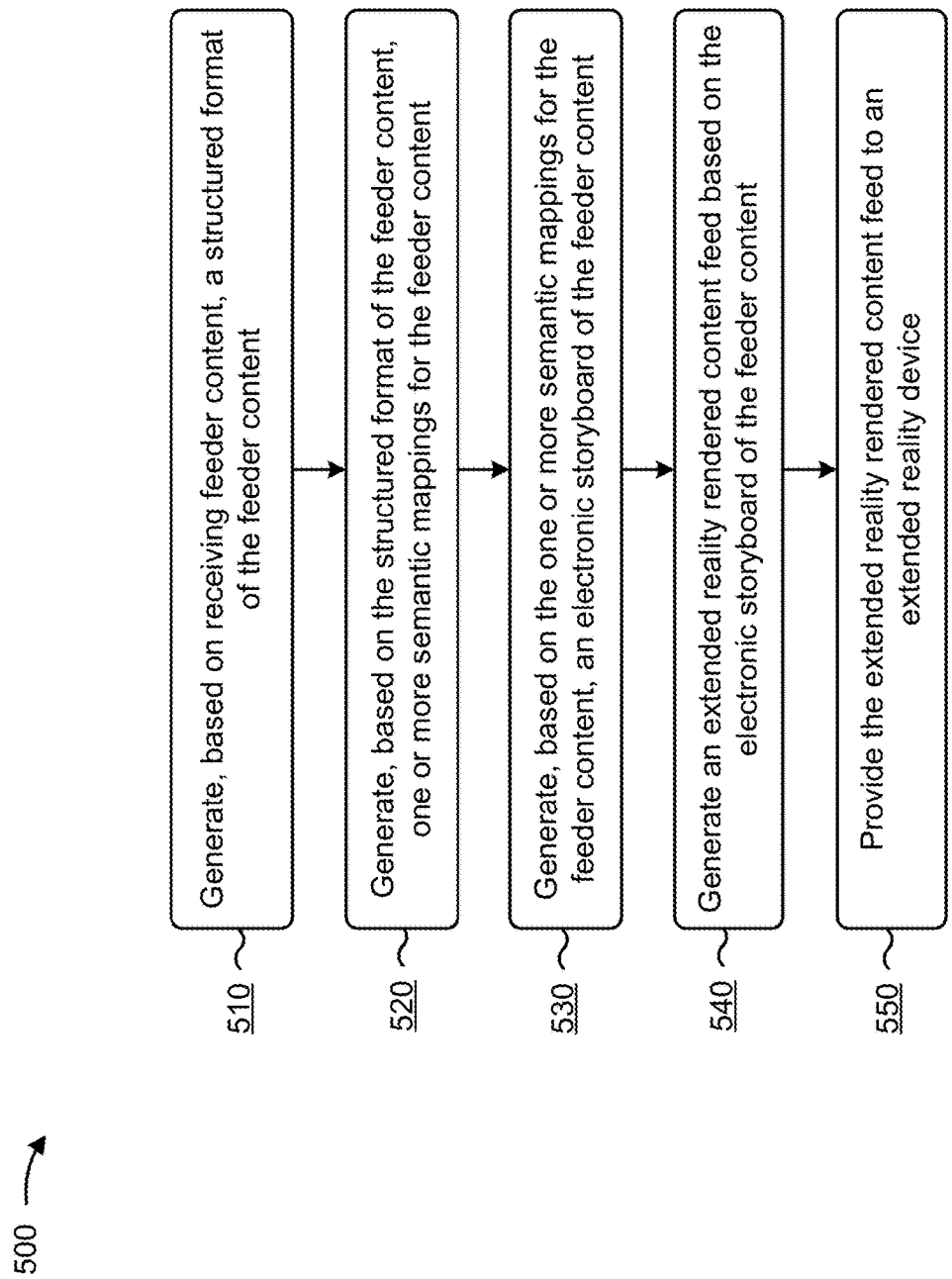
FIG. 5 is a flow chart of an example process for representing an immersive content feed using extended reality.

FIG. 5 is a flow chart of an example process 500 for representing a software application using extended reality. In some implementations, one or more process blocks of FIG. 5 may be performed by an immersive content platform, such as immersive content platform 230, immersive content platform 400, and/or the like. In some implementations, one or more process blocks of FIG. 5 may be performed by another device or a group of devices separate from or including the immersive content platform, such as an extended reality device (e.g., extended reality device 210), a server device (e.g., server device 220), and/or the like.

As shown in FIG. 5, process 500 may include generating, based on receiving feeder content, a structured format of the feeder content (block 510). For example, the immersive content platform (e.g., using computing resource 234, processor 320, memory 330, storage component 340, input component 350, output component 360, communication interface 370, and/or the like) may generate, based on receiving feeder content, a structured format of the feeder content, as described above in connection with FIGS. 1A-1D and/or FIG. 4.

As further shown in FIG. 5, process 500 may include generating, based on the structured format of the feeder content, one or more semantic mappings for the feeder content (block 520). For example, the immersive content platform (e.g., using computing resource 234, processor 320, memory 330, storage component 340, input component 350, output component 360, communication interface 370, and/or the like) may generate, based on the structured format of the feeder content, one or more semantic mappings for the feeder content, as described above in connection with FIGS. 1A-1D and/or FIG. 4.

As further shown in FIG. 5, process 500 may include generating, based on the one or more semantic mappings for the feeder content, an electronic storyboard of the feeder content (block 530). For example, the immersive content platform (e.g., using computing resource 234, processor 320, memory 330, storage component 340, input component 350, output component 360, communication interface 370, and/or the like) may generate, based on the one or more semantic mappings for the feeder content, an electronic storyboard of the feeder content, as described above in connection with FIGS. 1A-1D and/or FIG. 4.

As further shown in FIG. 5, process 500 may include generating an extended reality rendered content feed based on the electronic storyboard of the feeder content (block 540). For example, the immersive content platform (e.g., using computing resource 234, processor 320, memory 330, storage component 340, input component 350, output component 360, communication interface 370, and/or the like) may generate an extended reality rendered content feed based on the electronic storyboard of the feeder content, as described above in connection with FIGS. 1A-1D and/or FIG. 4.

As further shown in FIG. 5, process 500 may include providing the extended reality rendered content feed to an extended reality device (block 550). For example, the immersive content platform (e.g., using computing resource 234, processor 320, memory 330, storage component 340, input component 350, output component 360, communication interface 370, and/or the like) may provide the extended reality rendered content feed to an extended reality device, as described above in connection with FIGS. 1A-1D and/or FIG. 4.

Process 500 may include additional implementations, such as any single implementation or any combination of implementations described below and/or in connection with one or more other processes described elsewhere herein.

In some implementations, the one or more semantic mappings for the feeder content may include at least one of a background mapping that includes one or more objects, identified in the feeder content, that are to be displayed in a background of the extended reality rendered content feed, a foreground mapping that includes one or more objects, identified in the feeder content, that are to be displayed in a foreground of the extended reality rendered content feed, an emotion mapping that includes one or more emotions, associated with the feeder content, that are to be represented in the extended reality rendered content feed, and/or the like.

In some implementations, when generating the structured format of the feeder content, the immersive content platform may parse, using natural language processing, the feeder content to identify one or more words included in the feeder content, and assign a token to each word of the one or more words, wherein the token is associated with a token type of a plurality of token types. In some implementations, when generating the extended reality rendered content feed, the immersive content platform may determine, based on receiving extended reality device information associated with the extended reality device, an extended reality device type associated with the extended reality device, and generate, based on the extended reality device type, the extended reality rendered content feed.

In some implementations, an extended reality device type, associated with the extended reality device, may include an augmented reality device type, and the immersive content platform, when generating the extended reality rendered content feed, may generate an augmented reality rendered content feed based on the electronic storyboard of the feeder content. In some implementations, the immersive content platform may generate a relevancy score for the extended reality rendered content feed, wherein, when generating the relevancy score, the immersive content platform may generate a structured format of the electronic storyboard, generate one or more semantic mappings for the electronic storyboard, and generate the relevancy score based on a percentage match between the one or more semantic mappings for the feeder content and the one or more semantic mappings for the electronic storyboard; and may provide the extended reality rendered content feed to the extended reality device based on determining that the relevancy score satisfies a relevancy score threshold.

In some implementations, when generating the structured format of the electronic storyboard, the immersive content platform may extract, from the electronic storyboard, at least one of one or more objects represented in the electronic storyboard, one or more actors represented in the electronic storyboard, one or more actions represented in the electronic storyboard, or one or more geolocations represented in the electronic storyboard.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
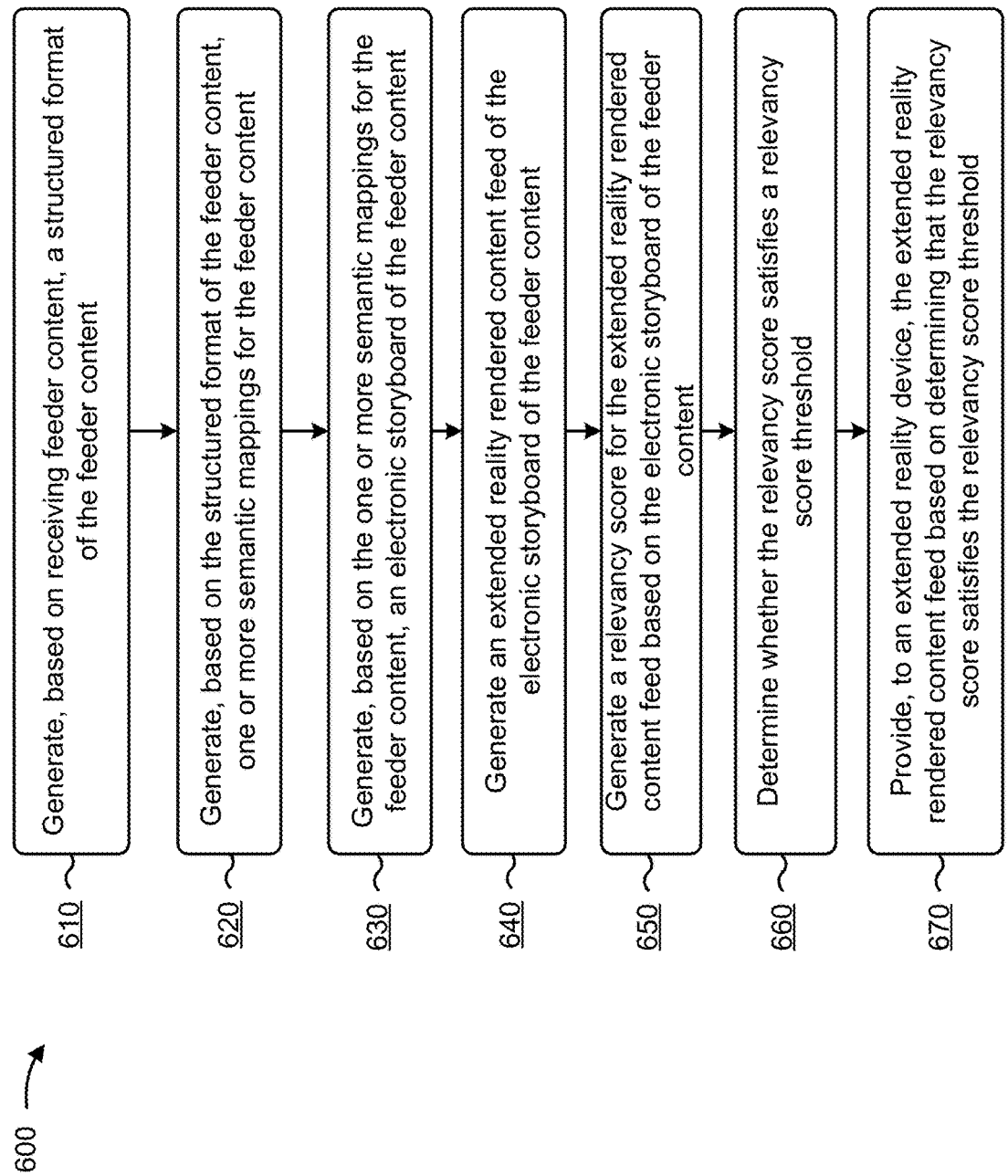
FIG. 6 is a flow chart of an example process for representing an immersive content feed extended reality.

FIG. 6 is a flow chart of an example process 600 for representing a software application using extended reality. In some implementations, one or more process blocks of FIG. 6 may be performed by an immersive content platform, such as immersive content platform 230, immersive content platform 400, and/or the like. In some implementations, one or more process blocks of FIG. 6 may be performed by another device or a group of devices separate from or including the immersive content platform, such as an extended reality device (e.g., extended reality device 210), a server device (e.g., server device 220), and/or the like.

As shown in FIG. 6, process 600 may include generating, based on receiving feeder content, a structured format of the feeder content (block 610). For example, the immersive content platform (e.g., using computing resource 234, processor 320, memory 330, storage component 340, input component 350, communication interface 370, and/or the like) may generate, based on receiving feeder content, a structured format of the feeder content, as described above in connection with FIGS. 1A-1D and/or FIG. 4.

As further shown in FIG. 6, process 600 may include generating, based on the structured format of the feeder content, one or more semantic mappings for the feeder content (block 620). For example, the immersive content platform (e.g., using computing resource 234, processor 320, memory 330, storage component 340, input component 350, output component 360, communication interface 370, and/or the like) may generate, based on the structured format of the feeder content, one or more semantic mappings for the feeder content, as described above in connection with FIGS. 1A-1D and/or FIG. 4.

As further shown in FIG. 6, process 600 may include generating, based on the one or more semantic mappings for the feeder content, an electronic storyboard of the feeder content (block 630). For example, the immersive content platform (e.g., using computing resource 234, processor 320, memory 330, storage component 340, input component 350, output component 360, communication interface 370, and/or the like) may generate, based on the one or more semantic mappings for the feeder content, an electronic storyboard of the feeder content, as described above in connection with FIGS. 1A-1D and/or FIG. 4.

As further shown in FIG. 6, process 600 may include generating an extended reality rendered content feed based on the electronic storyboard of the feeder content (block 640). For example, the immersive content platform (e.g., using computing resource 234, processor 320, memory 330, storage component 340, input component 350, output component 360, communication interface 370, and/or the like) may generate an extended reality rendered content feed based on the electronic storyboard of the feeder content, as described above in connection with FIGS. 1A-1D and/or FIG. 4.

As further shown in FIG. 6, process 600 may include generating a relevancy score for the extended reality rendered content feed (block 650). For example, the immersive content platform (e.g., using computing resource 234, processor 320, memory 330, storage component 340, input component 350, output component 360, communication interface 370, and/or the like) may generate a relevancy score for the extended reality rendered content feed, as described above in connection with FIGS. 1A-1D and/or FIG. 4.

As further shown in FIG. 6, process 600 may include determining whether the relevancy score satisfies a relevancy score threshold (block 660). For example, the immersive content platform (e.g., using computing resource 234, processor 320, memory 330, storage component 340, input component 350, output component 360, communication interface 370, and/or the like) may determine whether the relevancy score satisfies a relevancy score threshold, as described above in connection with FIGS. 1A-1D and/or FIG. 4.

As further shown in FIG. 6, process 600 may include providing, to an extended reality device, the extended reality rendered content feed based on determining that the relevancy score satisfies the relevancy score threshold (block 670). For example, the immersive content platform (e.g., using computing resource 234, processor 320, memory 330, storage component 340, input component 350, output component 360, communication interface 370, and/or the like) may provide, to an extended reality device, the extended reality rendered content feed based on determining that the relevancy score satisfies the relevancy score threshold, as described above in connection with FIGS. 1A-1D and/or FIG. 4.

Process 600 may include additional implementations, such as any single implementation or any combination of implementations described below and/or in connection with one or more other processes described elsewhere herein.

In some implementations, the electronic storyboard of the feeder content may include a plurality of electronic storyboards of the feeder content, wherein each electronic storyboard, of the plurality of electronic storyboards, comprises a sequence of images that represent one or more actions, of a plurality of actions, that are identified in the feeder content. In some implementations, when generating the structured format of the feeder content, the immersive content platform may parse, using natural language processing, the feeder content to identify one or more words included in the feeder content, and may assign a token to each word of the one or more words, wherein the token is associated with a token type of a plurality of token types, and wherein the plurality of token types includes at least one of an actor token type, an object token type, a geolocation token type, an action token type, and/or the like.

In some implementations, when generating the extended reality rendered content feed, the immersive content platform may generate an augmented reality rendered content feed based on the electronic storyboard of the feeder content, and when generating the augmented reality rendered content feed, the immersive content platform may generate a holographic representation of an object, included in the feeder content, by analyzing an image, associated with the object, included in the electronic storyboard of the feeder content using a convolutional neural network and incorporate the holographic representation of the object into the augmented reality rendered content feed. In some implementations, when generating the extended reality rendered content feed, the immersive content platform is to generate an augmented reality rendered content feed based on the electronic storyboard of the feeder content, wherein the augmented reality rendered content feed includes an overlay of one or more navigation instructions associated with a geolocation identified in the feeder content.

In some implementations, the relevancy score may be a first relevancy score, the relevancy score threshold may be a first relevancy score threshold, and the immersive content platform may generate a second relevancy score for the electronic storyboard of the feeder content, determine whether the second relevancy score satisfies a second relevancy score threshold, and modify, based on determining that the second relevancy score does not satisfy the second relevancy score threshold, the electronic storyboard of the feeder content.

In some implementations, when generating the relevancy score for the extended reality rendered content feed, the immersive content platform may generate a structured format of the extended reality rendered content feed, generate, based on the structured format of the extended reality rendered content feed, one or more semantic mappings for the extended reality rendered content feed, and generate the relevancy score for the extended reality rendered content feed based on a percentage match between the one or more semantic mappings for the feeder content and the one or more semantic mappings for the extended reality rendered content feed.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
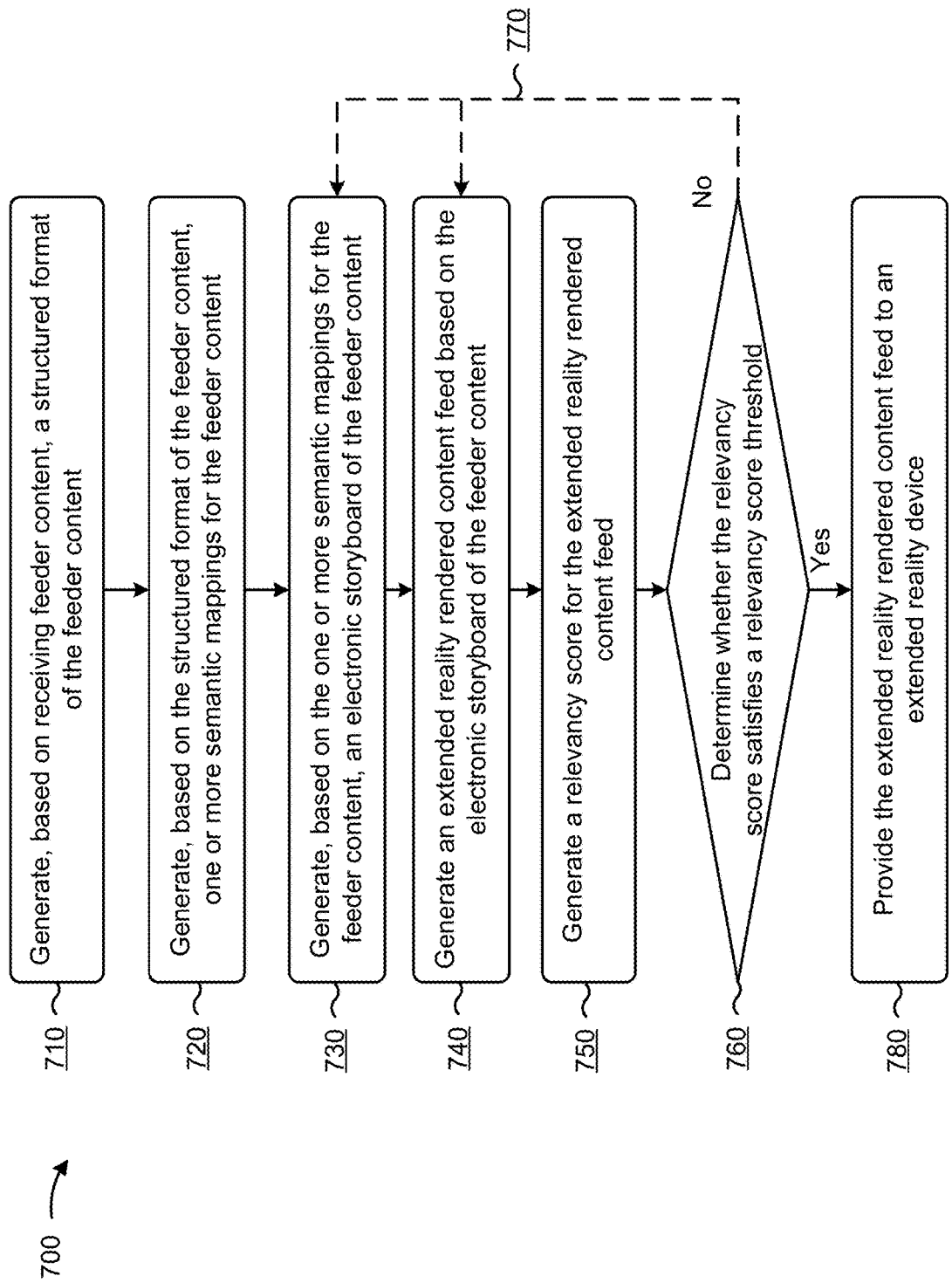
FIG. 7 is a flow chart of an example process for representing an immersive content feed extended reality.

FIG. 7 is a flow chart of an example process 700 for representing a software application using extended reality. In some implementations, one or more process blocks of FIG. 7 may be performed by an immersive content platform, such as immersive content platform 230, immersive content platform 400, and/or the like. In some implementations, one or more process blocks of FIG. 7 may be performed by another device or a group of devices separate from or including the immersive content platform, such as an extended reality device (e.g., extended reality device 210), a server device (e.g., server device 220), and/or the like.

As shown in FIG. 7, process 700 may include generating, based on receiving feeder content, a structured format of the feeder content (block 710). For example, the immersive content platform (e.g., using computing resource 234, processor 320, memory 330, storage component 340, input component 350, communication interface 370, and/or the like) may generate, based on receiving feeder content, a structured format of the feeder content, as described above in connection with FIGS. 1A-1D and/or FIG. 4.

As further shown in FIG. 7, process 700 may include generating, based on the structured format of the feeder content, one or more semantic mappings for the feeder content (block 720). For example, the immersive content platform (e.g., using computing resource 234, processor 320, memory 330, storage component 340, input component 350, output component 360, communication interface 370, and/or the like) may generate, based on the structured format of the feeder content, one or more semantic mappings for the feeder content, as described above in connection with FIGS. 1A-1D and/or FIG. 4.

As further shown in FIG. 7, process 700 may include generating, based on the one or more semantic mappings for the feeder content, an electronic storyboard of the feeder content (block 730). For example, the immersive content platform (e.g., using computing resource 234, processor 320, memory 330, storage component 340, input component 350, output component 360, communication interface 370, and/or the like) may generate, based on the one or more semantic mappings for the feeder content, an electronic storyboard of the feeder content, as described above in connection with FIGS. 1A-1D and/or FIG. 4.

As further shown in FIG. 7, process 700 may include generating an extended reality rendered content feed of the electronic storyboard of the feeder content (block 740). For example, the immersive content platform (e.g., using computing resource 234, processor 320, memory 330, storage component 340, input component 350, output component 360, communication interface 370, and/or the like) may generate an extended reality rendered content feed of the electronic storyboard of the feeder content, as described above in connection with FIGS. 1A-1D and/or FIG. 4.

As further shown in FIG. 7, process 700 may include generating a relevancy score for the extended reality rendered content feed of the electronic storyboard of the feeder content (block 750). For example, the immersive content platform (e.g., using computing resource 234, processor 320, memory 330, storage component 340, input component 350, output component 360, communication interface 370, and/or the like) may generate a relevancy score for the extended reality rendered content feed of the electronic storyboard of the feeder content, as described above in connection with FIGS. 1A-1D and/or FIG. 4.

As further shown in FIG. 7, process 700 may include determining whether the relevancy score satisfies a relevancy score threshold (block 760). For example, the immersive content platform (e.g., using computing resource 234, processor 320, memory 330, storage component 340, input component 350, output component 360, communication interface 370, and/or the like) may determine whether the relevancy score satisfies a relevancy score threshold, as described above in connection with FIGS. 1A-1D and/or FIG. 4.

As further shown in FIG. 7, based on determining that the relevancy score does not satisfy the relevancy score threshold (block 760-No), process 700 may include generating at least one of a modified storyboard of the feeder content, or a modified extended reality rendered content feed of the electronic storyboard of the feeder content (block 770). For example, the immersive content platform (e.g., using computing resource 234, processor 320, memory 330, storage component 340, input component 350, output component 360, communication interface 370, and/or the like) may generate at least one of a modified storyboard of the feeder content, or a modified extended reality rendered content feed of the electronic storyboard of the feeder content, as described above in connection with FIGS. 1A-1D and/or FIG. 4.

As further shown in FIG. 7, based on determining that the relevancy score satisfies the relevancy score threshold (block 770—Yes), process 700 may include providing, to an extended reality device, the extended reality rendered content feed of the electronic storyboard of the feeder content (block 780). For example, the immersive content platform (e.g., using computing resource 234, processor 320, memory 330, storage component 340, input component 350, output component 360, communication interface 370, and/or the like) may provide, to an extended reality device, the extended reality rendered content feed of the electronic storyboard of the feeder content, as described above in connection with FIGS. 1A-1D and/or FIG. 4.

Process 700 may include additional implementations, such as any single implementation or any combination of implementations described below and/or in connection with one or more other processes described elsewhere herein.

In some implementations, when generating the relevancy score, the immersive content platform may analyze the extended reality rendered content feed to generate the structured format of the extended reality rendered content feed, may generate, based on the structured format of the extended reality rendered content feed, one or more semantic mappings for the extended reality rendered content feed, and may generate the relevancy score based on a percentage match between at least one of the structured format of the feeder content and the structured format of the extended reality rendered content feed, or the one or more semantic mappings for the feeder content and the one or more semantic mappings for the extended reality rendered content feed.

In some implementations, the one or more semantic mappings for the feeder content may include an emotion mapping that includes a progression of one or more emotions, associated with the feeder content, that are to be represented in the extended reality rendered content feed. In some implementations, the one or more semantic mappings for the feeder content may include a foreground mapping that includes at least one of one or more objects, identified in the feeder content, that are to be displayed in a foreground of the extended reality rendered content feed, or one or more actors, identified in the feeder content, that are to be displayed in the foreground of the extended reality rendered content feed.

In some implementations, the one or more semantic mappings for the feeder content may include a background mapping that includes a geographic location, identified in the feeder content, that is to be represented in a background of the extended reality rendered content feed. In some implementations, when generating the structured format of the feeder content, the immersive content platform may use a machine learning probabilistic classifier to associate one or more words, identified in the feeder content, with a token type of a plurality of token types.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories; and
one or more processors, communicatively coupled to the one or more memories, to:
generate, based on receiving feeder content, a structured format of the feeder content;
generate, based on the structured format of the feeder content, one or more semantic mappings for the feeder content;
generate, based on the one or more semantic mappings for the feeder content, an electronic storyboard of the feeder content;
generate an extended reality rendered content feed based on the electronic storyboard of the feeder content;
generate a relevancy score for the extended reality rendered content feed, wherein the one or more processors, when generating the relevancy score, are to:
generate a structured format of the electronic storyboard,
generate one or more semantic mappings for the electronic storyboard, and
generate the relevancy score based on a percentage match between the one or more semantic mappings for the feeder content and the one or more semantic mappings for the electronic storyboard; and
provide the extended reality rendered content feed to an extended reality device based on determining that the relevancy score satisfies a relevancy score threshold.

2. The device of claim 1, wherein the one or more semantic mappings for the feeder content comprises at least one of:
a background mapping that includes one or more objects, identified in the feeder content, that are to be displayed in a background of the extended reality rendered content feed,
a foreground mapping that includes one or more objects, identified in the feeder content, that are to be displayed in a foreground of the extended reality rendered content feed, or
an emotion mapping that includes one or more emotions, associated with the feeder content, that are to be represented in the extended reality rendered content feed.

3. The device of claim 1, wherein the one or more processors, when generating the structured format of the feeder content, are to:
parse, using natural language processing, the feeder content to identify one or more words included in the feeder content; and
assign a token to each word of the one or more words, wherein the token is associated with a token type of a plurality of token types.

4. The device of claim 1, wherein the one or more processors, when generating the extended reality rendered content feed, are to:
determine, based on receiving extended reality device information associated with the extended reality device, an extended reality device type associated with the extended reality device; and
generate, based on the extended reality device type, the extended reality rendered content feed.

5. The device of claim 1, wherein an extended reality device type, associated with the extended reality device, includes an augmented reality device type; and
wherein the one or more processors, when generating the extended reality rendered content feed, are to:
generate an augmented reality rendered content feed based on the electronic storyboard of the feeder content.

6. The device of claim 1, wherein the one or more processors, when generating the structured format of the electronic storyboard, are to:
extract, from the electronic storyboard, at least one of:
one or more objects represented in the electronic storyboard,
one or more actors represented in the electronic storyboard,
one or more actions represented in the electronic storyboard, or
one or more geolocations represented in the electronic storyboard.

7. A method, comprising:
generating, by a device and based on receiving feeder content, a structured format of the feeder content;
generating, by the device and based on the structured format of the feeder content, one or more semantic mappings for the feeder content;
generating, by the device and based on the one or more semantic mappings for the feeder content, an electronic storyboard of the feeder content,
wherein the electronic storyboard of the feeder content comprises:
a plurality of electronic storyboards of the feeder content,
wherein each electronic storyboard, of the plurality of electronic storyboards, comprises a sequence of images that represent one or more actions, of a plurality of actions, that are identified in the feeder content;
generating, by the device, an extended reality rendered content feed based on the electronic storyboard of the feeder content;
generating, by the device, a relevancy score for the extended reality rendered content feed;
determining, by the device, whether the relevancy score satisfies a relevancy score threshold; and
providing, by the device and to an extended reality device, the extended reality rendered content feed based on determining that the relevancy score satisfies the relevancy score threshold.

8. The method of claim 7, wherein generating the structured format of the feeder content comprises:
parsing, using natural language processing, the feeder content to identify one or more words included in the feeder content; and
assigning a token to each word of the one or more words, wherein the token is associated with a token type of a plurality of token types, and
wherein the plurality of token types includes at least one of:
an actor token type,
an object token type,
a geolocation token type, or
an action token type.

9. The method of claim 7, wherein generating the extended reality rendered content feed comprises:

generating an augmented reality rendered content feed based on the electronic storyboard of the feeder content,
wherein generating the augmented reality rendered content feed comprises:
generating a holographic representation of an object, included in the feeder content, by analyzing an image, associated with the object, included in the electronic storyboard of the feeder content using a convolutional neural network, and
incorporating the holographic representation of the object into the augmented reality rendered content feed.

10. The method of claim 7, wherein generating the extended reality rendered content feed comprises:
generating an augmented reality rendered content feed based on the electronic storyboard of the feeder content,
wherein the augmented reality rendered content feed includes an overlay of one or more navigation instructions associated with a geolocation identified in the feeder content.

11. The method of claim 7, wherein the relevancy score is a first relevancy score;
wherein the relevancy score threshold is a first relevancy score threshold; and the method further comprises:
generating a second relevancy score for the electronic storyboard of the feeder content,
determining whether the second relevancy score satisfies a second relevancy score threshold, and
modifying, based on determining that the second relevancy score does not satisfy the second relevancy score threshold, the electronic storyboard of the feeder content.

12. The method of claim 7, wherein generating the relevancy score for the extended reality rendered content feed comprises:
generating a structured format of the extended reality rendered content feed;
generating, based on the structured format of the extended reality rendered content feed, one or more semantic mappings for the extended reality rendered content feed; and
generating the relevancy score for the extended reality rendered content feed based on a percentage match between the one or more semantic mappings for the feeder content and the one or more semantic mappings for the extended reality rendered content feed.

13. A non-transitory computer-readable medium storing instructions, the instructions comprising:
one or more instructions that, when executed by one or more processors, cause the one or more processors to:
generate, based on receiving feeder content, a structured format of the feeder content;
generate, based on the structured format of the feeder content, one or more semantic mappings for the feeder content;
generate, based on the one or more semantic mappings for the feeder content, an electronic storyboard of the feeder content;
generate an extended reality rendered content feed based on the electronic storyboard of the feeder content;
generate a relevancy score for the extended reality rendered content feed,
wherein the one or more instructions, that cause the one or more processors to generate the relevancy score, cause the one or more processors to:
analyze the extended reality rendered content feed to generate the structured format of the extended reality rendered content feed,
generate, based on the structured format of the extended reality rendered content feed, one or more semantic mappings for the extended reality rendered content feed, and
generate the relevancy score based on a percentage match between at least one of:
the structured format of the feeder content and the structured format of the extended reality rendered content feed, or
the one or more semantic mappings for the feeder content and the one or more semantic mappings for the extended reality rendered content feed;
determine whether the relevancy score satisfies a relevancy score threshold; and
based on determining that the relevancy score does not satisfy the relevancy score threshold, generate at least one of:
a modified storyboard of the feeder content, or
a modified extended reality rendered content feed, or
based on determining that the relevancy score satisfies the relevancy score threshold, provide, to an extended reality device, the extended reality rendered content feed.

14. The non-transitory computer-readable medium of claim 13, wherein the one or more semantic mappings for the feeder content comprises:
an emotion mapping that includes a progression of one or more emotions, associated with the feeder content, that are to be represented in the extended reality rendered content feed.

15. The non-transitory computer-readable medium of claim 13, wherein the one or more semantic mappings for the feeder content comprises:
a foreground mapping that includes at least one of:
one or more objects, identified in the feeder content, that are to be displayed in a foreground of the extended reality rendered content feed, or
one or more actors, identified in the feeder content, that are to be displayed in the foreground of the extended reality rendered content feed.

16. The non-transitory computer-readable medium of claim 13, wherein the one or more semantic mappings for the feeder content comprises:
a background mapping that includes a geographic location, identified in the feeder content, that is to be represented in a background of the extended reality rendered content feed.

17. The non-transitory computer-readable medium of claim 13, wherein the one or more instructions, that cause the one or more processors to generate the structured format of the feeder content, cause the one or more processors to:
use a machine learning probabilistic classifier to associate one or more words, identified in the feeder content, with a token type of a plurality of token types.

18. A method, comprising:
generating, by a device and based on receiving feeder content, a structured format of the feeder content;
generating, by the device and based on the structured format of the feeder content, one or more semantic mappings for the feeder content;

generating, by the device and based on the one or more semantic mappings for the feeder content, an electronic storyboard of the feeder content;
generating, by the device, an extended reality rendered content feed based on the electronic storyboard of the feeder content,
   wherein generating the extended reality rendered content feed comprises:
      generating an augmented reality rendered content feed based on the electronic storyboard of the feeder content,
         wherein generating the augmented reality rendered content feed comprises:
            generating a holographic representation of an object, included in the feeder content, by analyzing an image, associated with the object, included in the electronic storyboard of the feeder content using a convolutional neural network, and
            incorporating the holographic representation of the object into the augmented reality rendered content feed;
generating, by the device, a relevancy score for the extended reality rendered content feed;
determining, by the device, whether the relevancy score satisfies a relevancy score threshold; and
providing, by the device and to an extended reality device, the extended reality rendered content feed based on determining that the relevancy score satisfies the relevancy score threshold.

19. A method, comprising:
generating, by a device and based on receiving feeder content, a structured format of the feeder content;
generating, by the device and based on the structured format of the feeder content, one or more semantic mappings for the feeder content;
generating, by the device and based on the one or more semantic mappings for the feeder content, an electronic storyboard of the feeder content;
generating, by the device, a relevancy score for the electronic storyboard of the feeder content;
determining, by the device, whether the relevancy score satisfies a relevancy score threshold;
modifying, by the device and based on determining that the relevancy score does not satisfy the relevancy score threshold, the electronic storyboard of the feeder content;
generating, by the device, an extended reality rendered content feed based on the electronic storyboard of the feeder content;
generating, by the device, another relevancy score for the extended reality rendered content feed;
determining, by the device, whether the other relevancy score satisfies another relevancy score threshold; and
providing, by the device and to an extended reality device, the extended reality rendered content feed based on determining that the other relevancy score satisfies the other relevancy score threshold.

20. A method, comprising:
generating, by a device and based on receiving feeder content, a structured format of the feeder content;
generating, by the device and based on the structured format of the feeder content, one or more semantic mappings for the feeder content;
generating, by the device and based on the one or more semantic mappings for the feeder content, an electronic storyboard of the feeder content;
generating, by the device, an extended reality rendered content feed based on the electronic storyboard of the feeder content;
generating, by the device, a relevancy score for the extended reality rendered content feed,
   wherein generating the relevancy score for the extended reality rendered content feed comprises:
      generating a structured format of the extended reality rendered content feed,
      generating, based on the structured format of the extended reality rendered content feed, one or more semantic mappings for the extended reality rendered content feed, and
      generating the relevancy score for the extended reality rendered content feed based on a percentage match between the one or more semantic mappings for the feeder content and the one or more semantic mappings for the extended reality rendered content feed;
determining, by the device, whether the relevancy score satisfies a relevancy score threshold; and
providing, by the device and to an extended reality device, the extended reality rendered content feed based on determining that the relevancy score satisfies the relevancy score threshold.

21. A device, comprising:
one or more memories; and
one or more processors, communicatively coupled to the one or more memories, to:
generate, based on receiving feeder content, a structured format of the feeder content;
generate, based on the structured format of the feeder content, one or more semantic mappings for the feeder content;
generate, based on the one or more semantic mappings for the feeder content, an electronic storyboard of the feeder content;
generate an extended reality rendered content feed based on the electronic storyboard of the feeder content,
   wherein the one or more processors, when generating the extended reality rendered content feed, are to:
      generate an augmented reality rendered content feed based on the electronic storyboard of the feeder content,
         wherein the one or more processors, when generating the augmented reality rendered content feed, are to:
            generate a holographic representation of an object, included in the feeder content, by analyzing an image, associated with the object, included in the electronic storyboard of the feeder content using a convolutional neural network, and
            incorporate the holographic representation of the object into the augmented reality rendered content feed; and
generate a relevancy score for the extended reality rendered content feed;
determine whether the relevancy score satisfies a relevancy score threshold; and provide the extended reality rendered content feed to an extended reality device based on determining that the relevancy score satisfies the relevancy score threshold.

22. A device, comprising:
one or more memories; and one or more processors, communicatively coupled to the one or more memories, to:

generate, based on receiving feeder content, a structured format of the feeder content;

generate, based on the structured format of the feeder content, one or more semantic mappings for the feeder content;

generate, based on the one or more semantic mappings for the feeder content, an electronic storyboard of the feeder content;

generate a relevancy score for the electronic storyboard of the feeder content;

determine whether the relevancy score satisfies a relevancy score threshold;

modify, based on determining that the relevancy score does not satisfy the relevancy score threshold, the electronic storyboard of the feeder content;

generate an extended reality rendered content feed based on the electronic storyboard of the feeder content;

generate another relevancy score for the extended reality rendered content feed;

determine whether the other relevancy score satisfies another relevancy score threshold; and provide the extended reality rendered content feed to an extended reality device based on determining that the other relevancy score satisfies the other relevancy score threshold.

23. A device, comprising:

one or more memories; and one or more processors, communicatively coupled to the one or more memories, to:

generate, based on receiving feeder content, a structured format of the feeder content;

generate, based on the structured format of the feeder content, one or more semantic mappings for the feeder content;

generate, based on the one or more semantic mappings for the feeder content, an electronic storyboard of the feeder content;

generate an extended reality rendered content feed based on the electronic storyboard of the feeder content;

generate a relevancy score for the extended reality rendered content feed;

wherein the one or more processors, when generating the relevancy score for the extended reality rendered content feed, are to:

generate a structured format of the extended reality rendered content feed, generate, based on the structured format of the extended reality rendered content feed, one or more semantic mappings for the extended reality rendered content feed, and generate the relevancy score for the extended reality rendered content feed based on a percentage match between the one or more semantic mappings for the feeder content and the one or more semantic mappings for the extended reality rendered content feed;

determine whether the relevancy score satisfies a relevancy score threshold; and provide the extended reality rendered content feed to an extended reality device based on determining that the relevancy score satisfies the relevancy score threshold.

* * * * *